(12) United States Patent
Buescher et al.

(10) Patent No.: US 9,752,798 B2
(45) Date of Patent: Sep. 5, 2017

(54) WATER HEATER CONTROL USING EXTERNAL TEMPERATURE SENSOR

(71) Applicant: Emerson Electric Co., St. Louis, MO (US)

(72) Inventors: Thomas P. Buescher, Webster Groves, MO (US); Thomas J. Fredricks, Wildwood, MO (US); Rishi Siravuri, Maryland Heights, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 15/050,548

(22) Filed: Feb. 23, 2016

(65) Prior Publication Data

US 2016/0169556 A1    Jun. 16, 2016

Related U.S. Application Data

(60) Division of application No. 13/826,713, filed on Mar. 14, 2013, now Pat. No. 9,310,098, which is a continuation-in-part of application No. 13/356,779, filed on Jan. 24, 2012, now Pat. No. 9,151,516, which is a continuation-in-part of application No.
(Continued)

(51) Int. Cl.
*H05B 1/02*       (2006.01)
*F24H 9/20*       (2006.01)
*G05D 23/19*      (2006.01)
*F24H 1/20*       (2006.01)

(52) U.S. Cl.
CPC ....... *F24H 9/2021* (2013.01); *G05D 23/1931* (2013.01); *H05B 1/0297* (2013.01); *F24D 2220/042* (2013.01); *F24D 2240/26* (2013.01); *F24H 1/202* (2013.01)

(58) Field of Classification Search
None
See application file for complete search history.

(56) References Cited

U.S. PATENT DOCUMENTS 2,266,146 A    10/1940   Biebel
3,240,426 A     3/1966   Newbury et al.
3,478,817 A    11/1969   Shaw
(Continued)

OTHER PUBLICATIONS

"The AQUA SMART Receiver/The AQUA SMART Transmitter" (2011). AQUA SMART, Inc., Vancouver, WA, 2 pages.

*Primary Examiner* — Thor Campbell
(74) *Attorney, Agent, or Firm* — Harness, Dickey & Pierce, P.L.C.

(57) ABSTRACT

A system and method for controlling a water heater that operates according to a voltage supply includes a temperature sensor, mounted on at least one of a temperature and pressure (T&P) valve of the water heater and a hot water line of the water heater, that generates a temperature signal corresponding to a first temperature of the at least one of the T&P valve and the hot water line. A control module mounted on the water heater includes a switching module that receives the voltage supply and outputs the voltage supply to the water heater. The voltage supply passes at least one of through and adjacent to the control module. The control module determines a second temperature of water within the water heater based on the temperature signal and selectively actuates the switching module to turn on and turn off the voltage supply to the water heater based on the second temperature.

13 Claims, 16 Drawing Sheets

Related U.S. Application Data

11/342,375, filed on Jan. 27, 2006, now Pat. No. 8,983,283.

(60) Provisional application No. 61/657,375, filed on Jun. 8, 2012.

(56) References Cited

U.S. PATENT DOCUMENTS

| | | |
|---|---|---|
| 3,597,588 A | 8/1971 | Kirschner et al. |
| 4,023,043 A | 5/1977 | Stevenson |
| 4,333,002 A | 6/1982 | Kozak |
| 4,568,821 A | 2/1986 | Boe |
| 4,771,185 A | 9/1988 | Feron et al. |
| 4,862,834 A | 9/1989 | Kurz et al. |
| 4,920,252 A | 4/1990 | Yoshino |
| 4,924,404 A | 5/1990 | Reinke, Jr. |
| 5,289,362 A | 2/1994 | Liebl et al. |
| 5,311,068 A | 5/1994 | Miller |
| 5,442,157 A | 8/1995 | Jackson |
| 5,481,140 A | 1/1996 | Maruyama et al. |
| 5,598,349 A | 1/1997 | Elliason et al. |
| 5,626,287 A | 5/1997 | Krause et al. |
| 5,683,605 A | 11/1997 | Matsuoka |
| 5,700,993 A | 12/1997 | Counsell et al. |
| 5,706,191 A | 1/1998 | Bassett et al. |
| 5,736,059 A | 4/1998 | Mackelvie |
| 6,029,092 A | 2/2000 | Stein |
| 6,109,533 A | 8/2000 | Ao et al. |
| 6,116,512 A | 9/2000 | Dushane et al. |
| 6,246,831 B1 | 6/2001 | Seitz et al. |
| 6,293,471 B1 | 9/2001 | Stettin et al. |
| 6,308,009 B1 | 10/2001 | Shellenberger et al. |
| 6,350,967 B1 | 2/2002 | Scott |
| 6,374,046 B1 | 4/2002 | Bradenbaugh |
| 6,493,643 B1 | 12/2002 | Aisa |
| 6,555,796 B1 | 4/2003 | Cusack |
| 6,574,581 B1 | 6/2003 | Bohrer et al. |
| 6,591,253 B1 | 7/2003 | Dinkin et al. |
| 6,633,726 B2 | 10/2003 | Bradenbaugh |
| 6,734,806 B1 | 5/2004 | Cratsley, III |
| 6,757,591 B2 | 6/2004 | Kramer |
| 6,772,052 B1 | 8/2004 | Amundsen et al. |
| 6,981,385 B2 | 1/2006 | Arshansky et al. |
| 7,032,543 B1 | 4/2006 | Akkala et al. |
| 7,162,150 B1 | 1/2007 | Welch et al. |
| 7,177,728 B2 | 2/2007 | Gardner |
| 7,221,862 B1 | 5/2007 | Miller et al. |
| 7,257,320 B2 | 8/2007 | Hartge |
| 7,274,305 B1 | 9/2007 | Luttrell |
| 7,590,472 B2 | 9/2009 | Hakim et al. |
| 8,019,697 B2 | 9/2011 | Ozog |
| 8,024,073 B2 | 9/2011 | Imes et al. |
| 8,103,563 B2 | 1/2012 | O'Neil |
| 8,140,414 B2 | 3/2012 | O'Neil et al. |
| 8,183,995 B2 | 5/2012 | Wang et al. |
| 8,204,633 B2 | 6/2012 | Harbin, III et al. |
| 8,326,466 B2 | 12/2012 | Peterson |
| 8,626,344 B2 | 1/2014 | Imes et al. |
| 8,983,283 B2 | 3/2015 | Miu et al. |
| 9,151,516 B2 | 10/2015 | Buescher et al. |
| 2001/0009609 A1 | 7/2001 | Bradenbaugh |
| 2002/0007388 A1 | 1/2002 | Bannai et al. |
| 2002/0040356 A1 | 4/2002 | Gluck et al. |
| 2003/0011486 A1 | 1/2003 | Ying |
| 2003/0036820 A1 | 2/2003 | Yellepeddy et al. |
| 2003/0083788 A1 | 5/2003 | Harada et al. |
| 2003/0091091 A1 | 5/2003 | Patterson et al. |
| 2003/0163224 A1 | 8/2003 | Klaar et al. |
| 2003/0178408 A1 | 9/2003 | Ghent |
| 2003/0183618 A1 | 10/2003 | Moreno |
| 2003/0233201 A1 | 12/2003 | Horst et al. |
| 2004/0069768 A1 | 4/2004 | Patterson et al. |
| 2004/0090195 A1 | 5/2004 | Motsenbocker |
| 2004/0117330 A1 | 6/2004 | Ehlers et al. |
| 2004/0128266 A1 | 7/2004 | Yellepeddy et al. |
| 2004/0133529 A1 | 7/2004 | Munster |
| 2004/0194825 A1 | 10/2004 | Kempf et al. |
| 2004/0206405 A1 | 10/2004 | Smith et al. |
| 2005/0006488 A1 | 1/2005 | Stanimirovic |
| 2005/0075738 A1 | 4/2005 | Attarwala |
| 2005/0096797 A1 | 5/2005 | Matsubara et al. |
| 2005/0099314 A1 | 5/2005 | Aisa |
| 2005/0102068 A1 | 5/2005 | Pimputkar et al. |
| 2005/0143865 A1 | 6/2005 | Gardner |
| 2005/0194456 A1 | 9/2005 | Tessier et al. |
| 2007/0175883 A1 | 8/2007 | Miu et al. |
| 2008/0086394 A1 | 4/2008 | O'Neil et al. |
| 2009/0001180 A1 | 1/2009 | Siddaramanna et al. |
| 2009/0009287 A1 | 1/2009 | Falcioni et al. |
| 2009/0157488 A1 | 6/2009 | O'Neil et al. |
| 2009/0195349 A1 | 8/2009 | Frader-Thompson et al. |
| 2009/0234513 A1 | 9/2009 | Wiggins |
| 2009/0292402 A1 | 11/2009 | Cruickshank, III |
| 2010/0004790 A1 | 1/2010 | Harbin, III et al. |
| 2010/0076615 A1 | 3/2010 | Daniel et al. |
| 2010/0114386 A1 | 5/2010 | Fima |
| 2012/0119922 A1 | 5/2012 | O'Neil |

WATER HEATER CONTROL USING EXTERNAL TEMPERATURE SENSOR

CROSS-REFERENCE TO RELATED APPLICATIONS

The present disclosure is a divisional of U.S. patent application Ser. No. 13/826,713, filed Mar. 14, 2013 (now U.S. Pat. No. 9,310,098 issued Apr. 12, 2016), which is a continuation-in-part of U.S. patent application Ser. No. 13/356,779, filed Jan. 24, 2012 (now U.S. Pat. No. 9,151, 516, issued Oct. 6, 2015), which is a continuation-in-part of Ser. No. 11/342,375, filed on Jan. 27, 2006 (now U.S. Pat. No. 8,983,283, issued Mar. 17, 2015). This application also claims the benefit of U.S. Provisional Application No. 61/657,375, filed on Jun. 8, 2012. The entire disclosures of the applications referenced above are incorporated herein by reference.

FIELD

The disclosure relates to electric water heaters and more particularly to a control system for controlling the capacity of an electric water heater for energy efficiency.

BACKGROUND

Electric water heaters are conventionally used in residential and commercial buildings to supply the occupants of the building with a reservoir of hot water. The water heater typically includes a tank that is fluidly coupled to a water supply of the building at an inlet and is fluidly coupled to building fixtures such as faucets, showers, and dishwashers at an outlet. The water heater tank receives cold water from the building water supply at the inlet and heats the water to a set point temperature using lower and upper heating elements. The lower and upper heating elements raise the temperature of the water disposed within the water heater tank to the set point temperature by converting current from a building power supply into radiant heat. The heated water is stored within the tank and is held at the set point temperature by the heating elements so that a supply of hot water is constantly and consistently provided at a desired temperature.

Conventional electric water heaters typically include a control system that monitors a temperature of water disposed within the water tank to ensure that the water contained therein is maintained at a predetermined set point temperature. The set point temperature is typically a consumer-selected setting that allows the consumer to determine a temperature of the hot water to be produced by the water heater. The control system continuously monitors the temperature of the water within the tank via a temperature sensor and compares the sensed temperature to the set point temperature. The control system generally includes an upper temperature sensor associated with the upper heating element and a lower temperature sensor associated with the lower heating element. The upper temperature sensor and lower temperature sensor each provide information regarding the water temperature near the respective elements. The respective sensors, in combination with the upper and lower heating elements, allow the control system to selectively heat the water disposed within the tank when the sensed temperature falls below the set point temperature.

In operation, the upper heating element of a conventional electric water heater is energized by the control system to heat a volume of water generally between the upper heating element and a top of the tank (i.e., an upper zone of the tank). Once the water in the upper zone of the tank is at the set point temperature, the control system de-energizes the upper heating element and energizes the lower heating element. The lower heating element heats a volume of water generally above the lower heating element and below the upper heating element (i.e., a lower zone of the tank). The lower heating element remains energized until the water within the lower zone of the tank is at the set point temperature.

Water, when heated, rises due to the physical properties (i.e., density) of heated water relative to the cooler water within the tank. Therefore, as the lower heating element heats water, the heated water rises within the tank and cold water descends toward the lower heating element. The descending cold water mixes with the passing hot water and is heated by the lower heating element. This process continues until the entire volume of water disposed within the lower zone of the tank reaches the set point temperature.

When a consumer draws hot water from the tank, the initial hot water drawn from the tank outlet is disposed within the top zone of the tank, near the upper heating element and upper temperature sensor. When the hot water exits the tank, a fresh supply of cold water is introduced into the tank at an inlet. The inlet is generally disposed at a bottom of the tank, below the lower heating element. The incoming cold water eventually contacts the lower heating element as the hot water is displaced (i.e., drawn from the tank at the outlet). At this point, the lower temperature sensor detects the influx of cold water and relays the information to the control system. The control system processes the information from the lower temperature sensor and energizes the lower heating element to heat the incoming cold water until the set point temperature is achieved.

If the consumer does not use all of the hot water available in the tank, the lower heating element remains energized and continues to heat the water (as described above) until the set point temperature is reached. However, there are instances when the consumer draws a sufficient volume of hot water from the tank such that the volume of cold water entering the tank reaches the upper heating element. Such an occurrence is known as a "deep draw" event. A deep draw event is identified when the upper temperature sensor detects a significant drop in temperature due to the incoming cold water. Upon detection of the incoming cold water, the control system de-energizes the lower heating element and energizes the upper heating element in an effort to quickly heat the smaller volume of cold water above the upper element to the set point temperature before the water exits the tank.

When the consumer stops using hot water, the influx of cold water is similarly stopped. At this point, the upper heating element continues to heat water disposed in the upper zone of the tank until the upper temperature sensor detects that the water disposed in the upper zone is at the set point temperature. The control system then de-energizes the upper heating element and energizes the lower heating element to heat the water disposed within the lower zone of the tank. The lower heating element remains energized until the lower temperature sensor detects that the temperature of the water disposed within the lower zone is at the set point temperature. In this manner, conventional hot water heaters include a control system that responds to a draw of hot water from the tank by continually heating the entire volume of water disposed within the tank to the set point temperature.

The capacity of an electric water heater is conventionally understood as the volume of water that the water heater is able to heat and maintain at a set point temperature. For example, an eighty-gallon water heater can heat and store eighty gallons of water. In this regard, then, the capacity of the eighty-gallon water heater is eighty gallons.

The effective capacity of the water heater that is realized by a consumer, however, is greater than the simple volume capacity of the water heater that was just described. This is so because a consumer does not typically use water at the set point temperature when a call for "hot water" at a household fixture is made. While the set point temperature for a water heater can vary, it is not uncommon that the set point is at 120° F. or higher. A consumer demand for "hot water" at a fixture, however, generally is for water at a comfortable temperature that is well below the set point temperature. Consequently, in order to produce the "hot water" that is used by the consumer, water drawn from the water heater is mixed with cold water from the building water supply. Thus, for example, for every gallon of "hot water" that is used by the consumer, only a half-gallon of water is drawn from the water heater. This effectively increases the amount of "hot water" that the electric water heater can provide to a consumer.

As a general proposition, the higher the set point temperature of the water heater, the lower the volume of water that needs to be drawn from the water heater in order to produce "hot water" for the consumer. Similarly, the lower the set point temperature of the water heater, the higher the volume of water that needs to be drawn from the water heater in order to produce "hot water" for the consumer. Thus, the effective capacity of the water heater can be adjusted by raising or lowering the set point temperature of the water heater. For example, a lower set point temperature would require more water from the water heater to produce the desired "hot water." Thus, hot water from the water heater is used faster and the effective capacity of the system is reduced. Conversely, raising the set point temperature would require less water from the water heater to provide the same "hot water." Increasing the set point temperature, therefore, increases the capacity of the water heater.

A conventional control system for an electric water heater generally operates to maintain the entire volume of water in the tank at the set point temperature, as described above. These control systems operate independent of the actual demands for hot water made by the consumer. Therefore, even if the consumer's requirements for "hot water" were regularly smaller than the effective capacity of the water heater, the water heater would nonetheless repeatedly heat all of the water to the set point temperature all of the time.

Therefore, it is desirable to provide a control system that can continuously monitor and adjust the effective capacity of an electric water heater based on consumer demands in order to save energy associated with operation of the electric water heater. Furthermore, it is also desirable to provide a control system that enables the electric water heater to satisfy government energy standards, while simultaneously providing a consumer with an adequate "hot water" capacity.

SUMMARY

A system for controlling a water heater that operates according to a voltage supply includes a temperature sensor, mounted on at least one of a temperature and pressure (T&P) valve of the water heater and a hot water line of the water heater, that generates a temperature signal corresponding to a first temperature of the at least one of the T&P valve and the hot water line. A control module mounted on the water heater includes a switching module that receives the voltage supply and outputs the voltage supply to the water heater. The voltage supply passes at least one of through and adjacent to the control module. The control module determines a second temperature of water within the water heater based on the temperature signal and selectively actuates the switching module to turn on and turn off the voltage supply to the water heater based on the second temperature.

A method for controlling a water heater that operates according to a voltage supply includes mounting a temperature sensor on at least one of a temperature and pressure (T&P) valve of the water heater and a hot water line of the water heater, generating a temperature signal corresponding to a first temperature of the at least one of the T&P valve and the hot water line, and mounting a control module on the water heater, the control module including a switching module that receives the voltage supply and outputs the voltage supply to the water heater. The voltage supply passes at least one of through and adjacent to the control module. The method further includes, using the control module, determining a second temperature of water within the water heater based on the temperature signal and selectively actuating the switching module to turn on and turn off the voltage supply to the water heater based on the second temperature.

Further areas of applicability of the present disclosure will become apparent from the detailed description, the claims and the drawings. The detailed description and specific examples are intended for purposes of illustration only and are not intended to limit the scope of the disclosure.

DRAWINGS

The disclosure will become more fully understood from the detailed description and the accompanying drawings, wherein.

Figure 11:
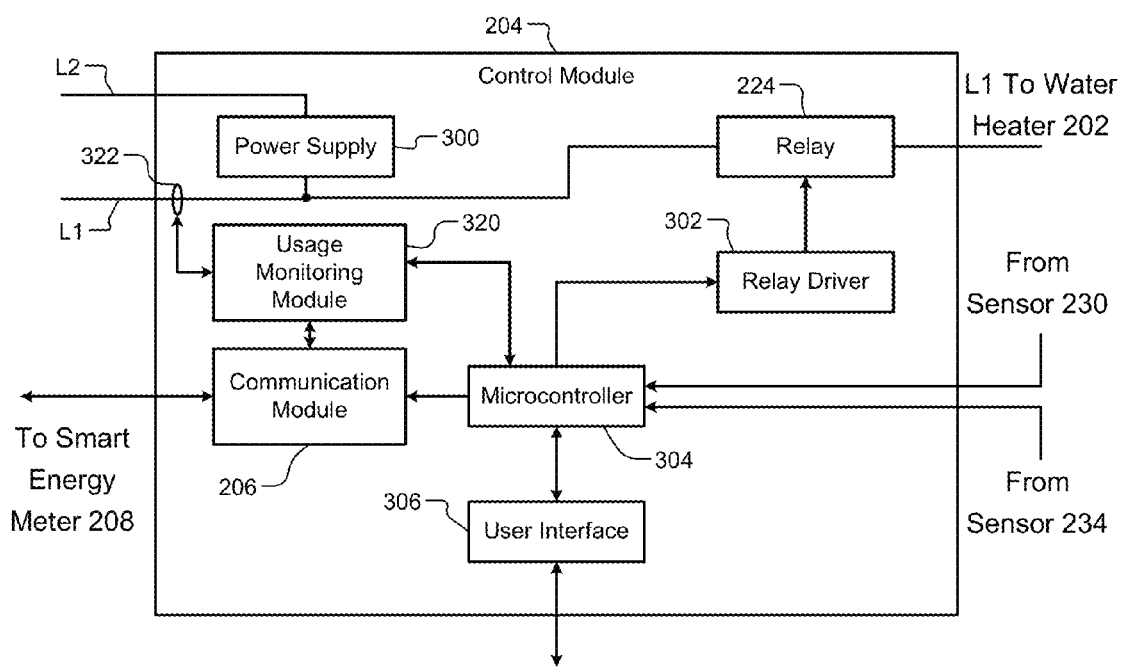
Figure 10A:
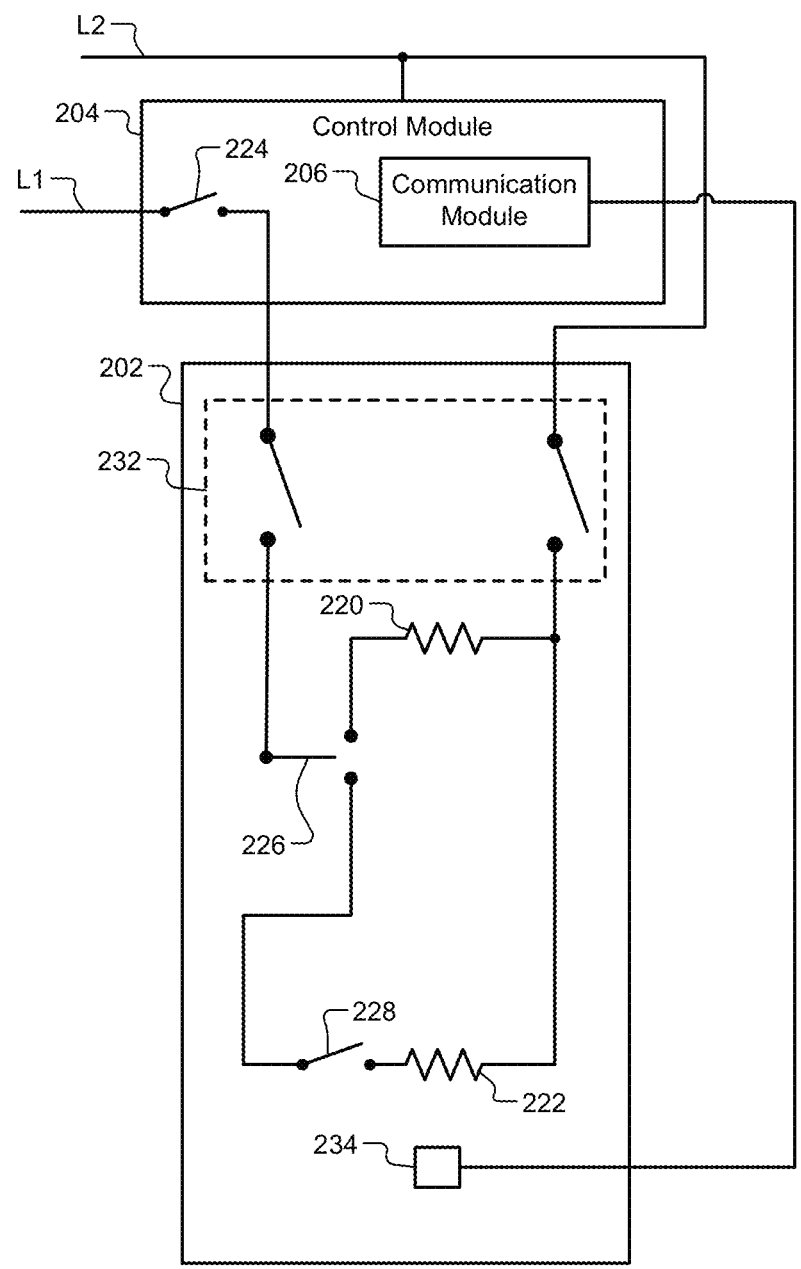
Figure 10B:
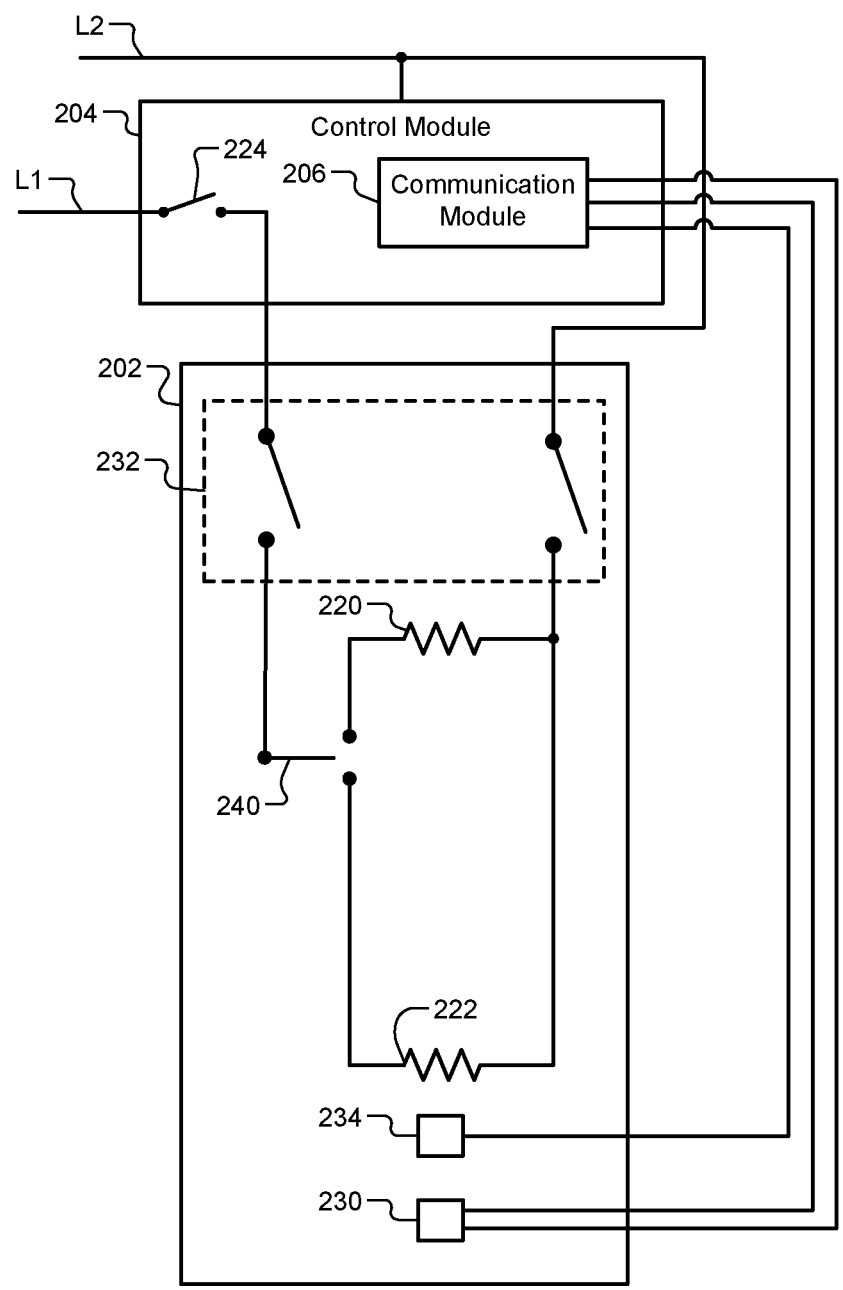
Figure 12:
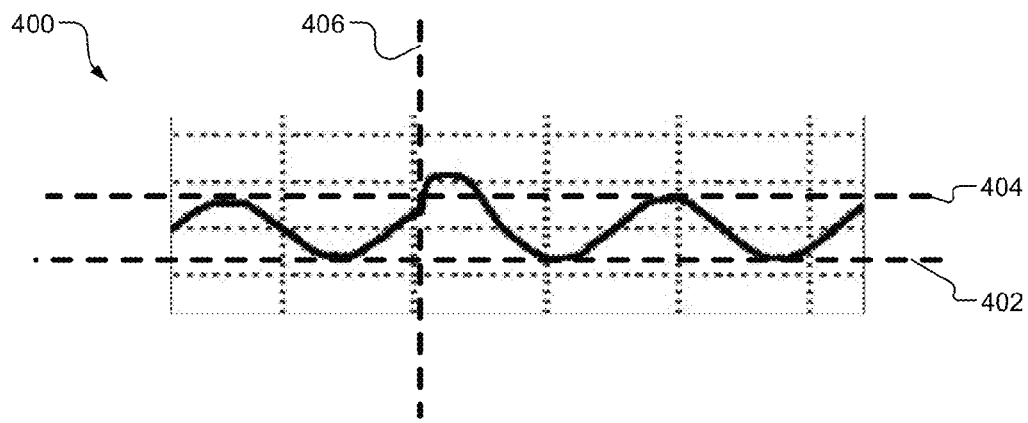
Figure 14:
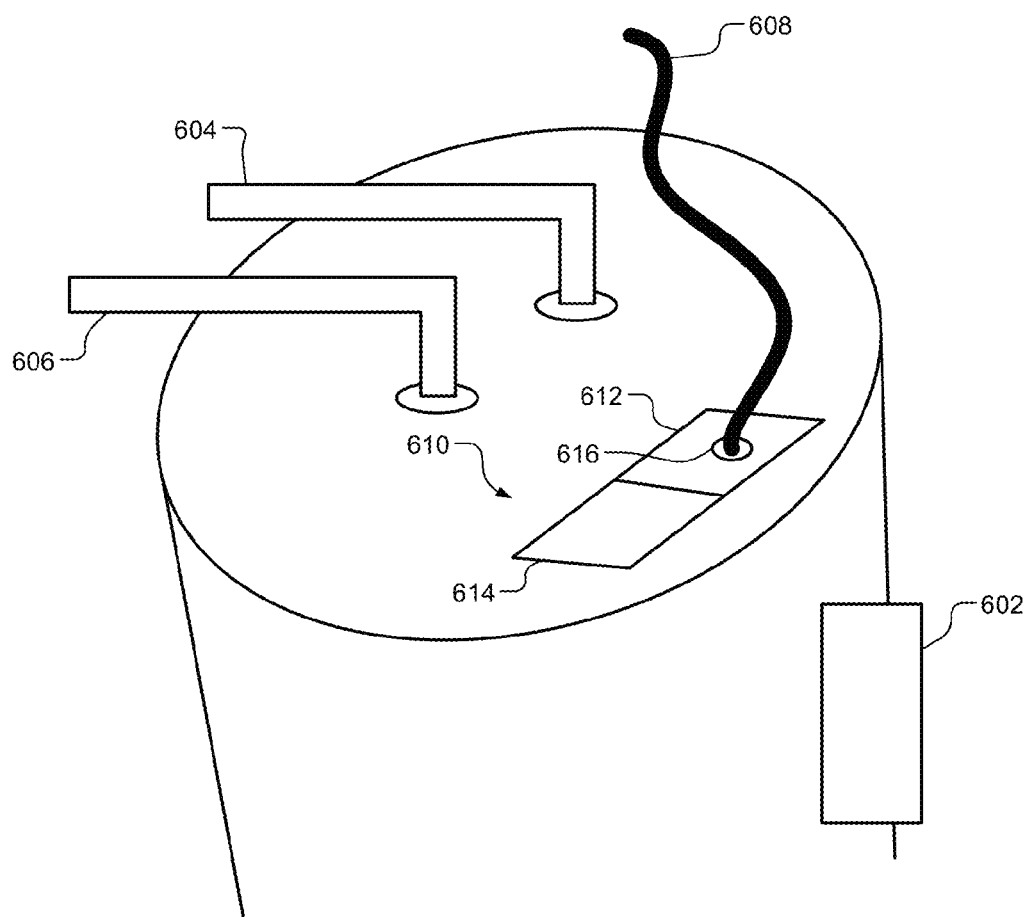
Figure 13:
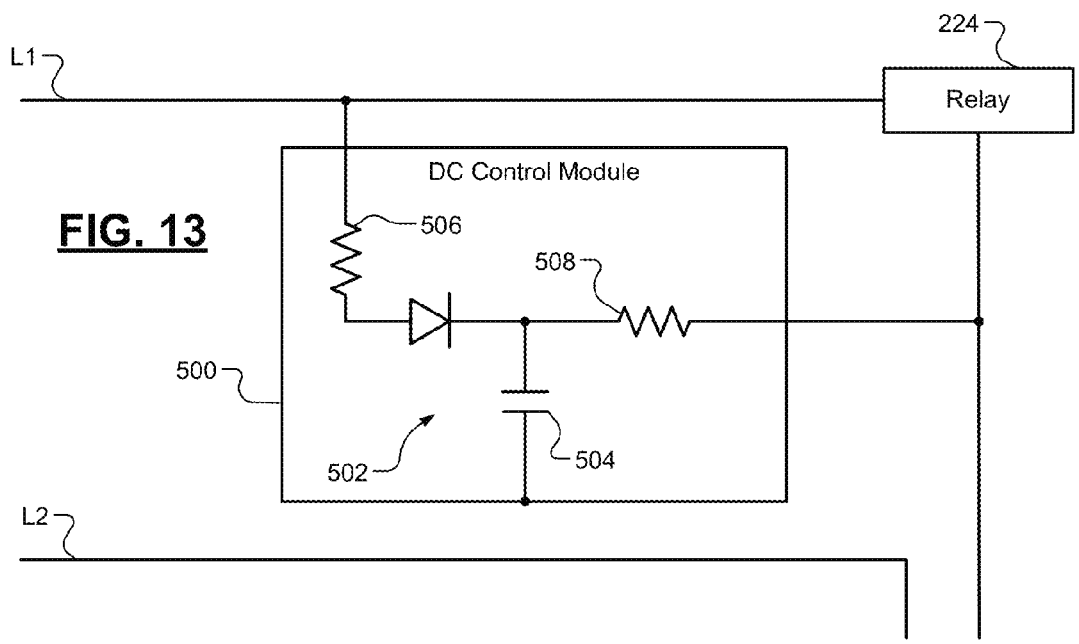
Figure 15:
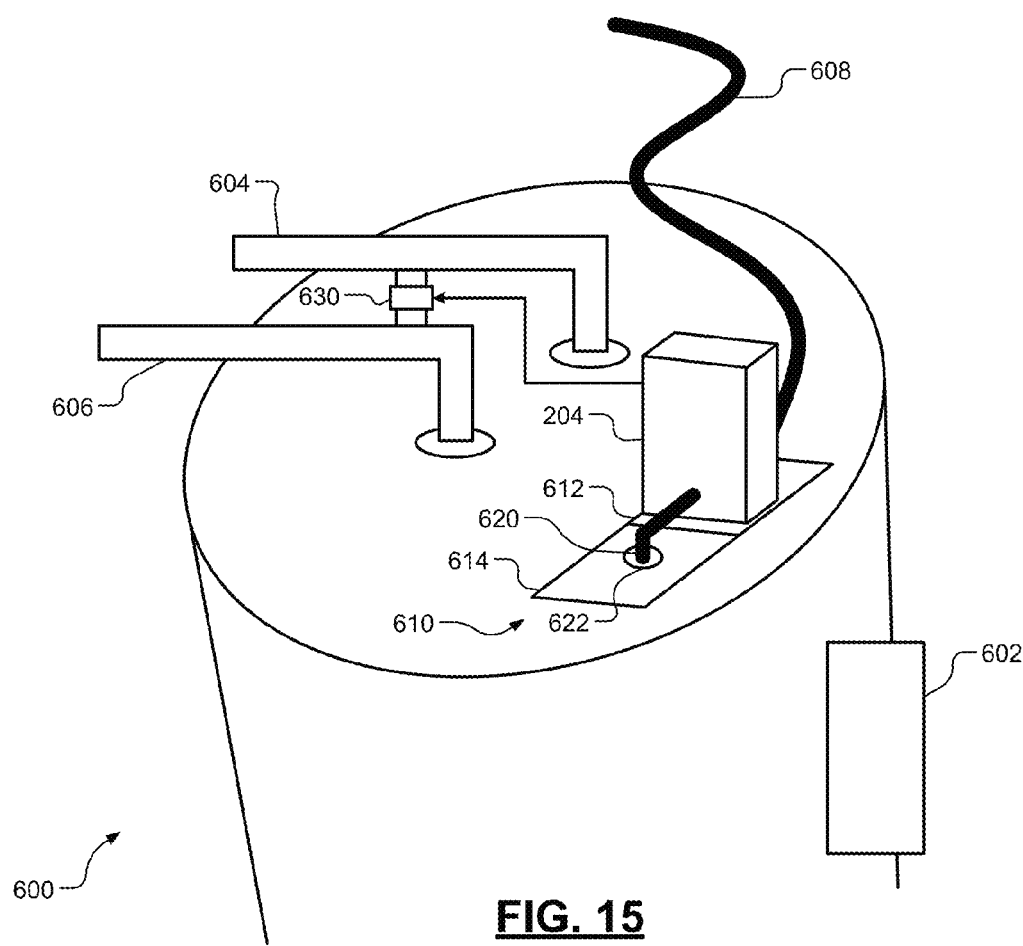
Figure 16:
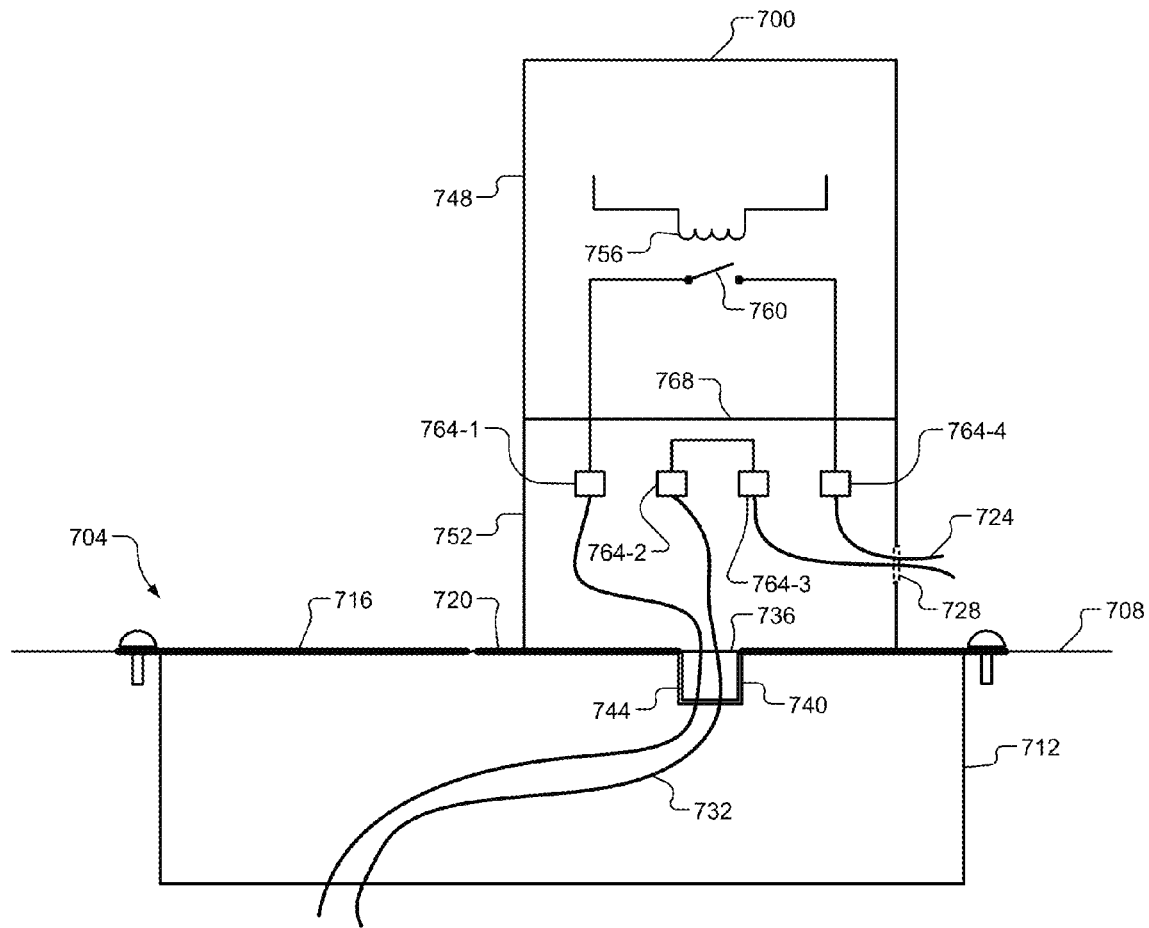
Figure 17:
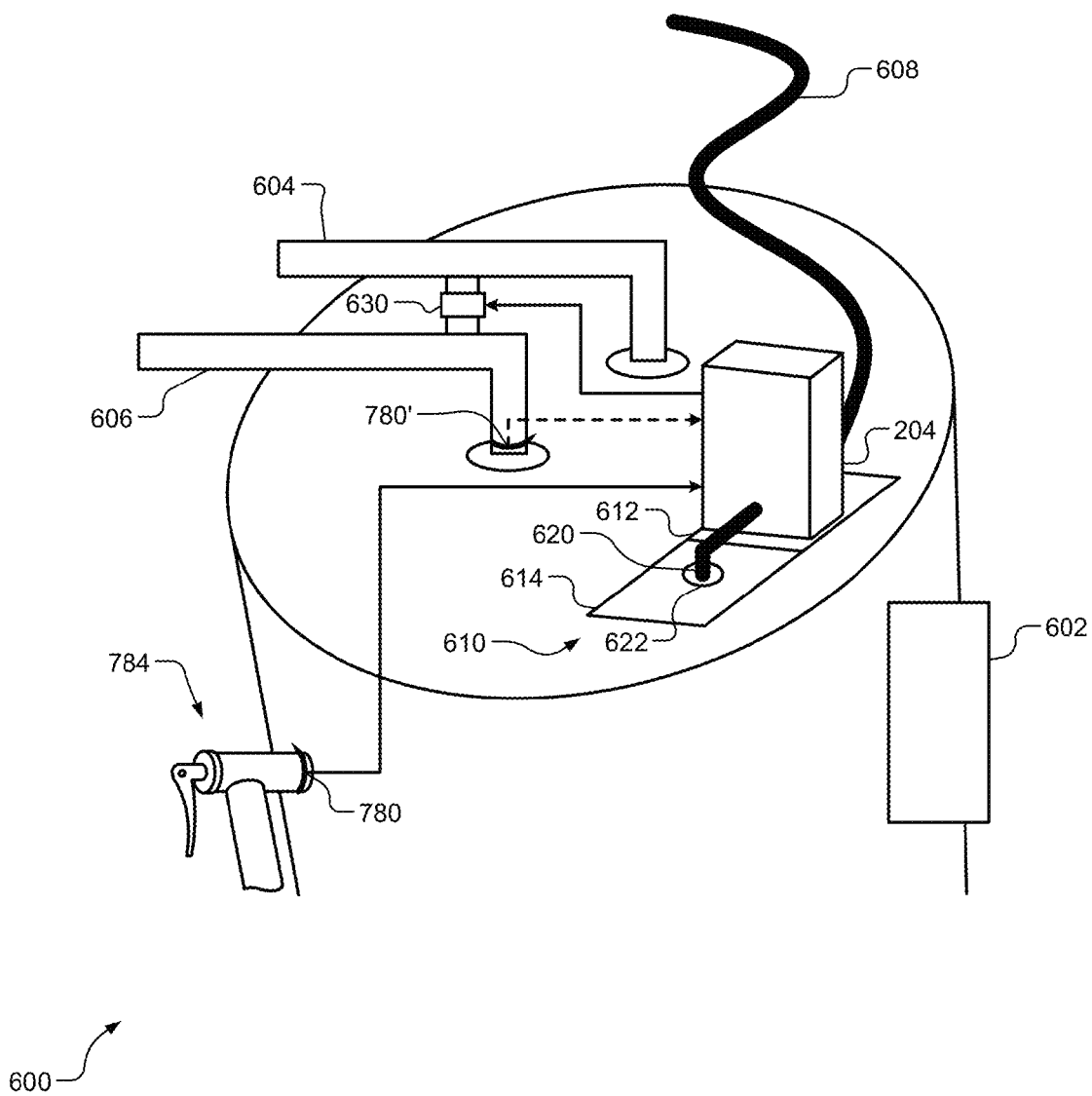
Figure 18:
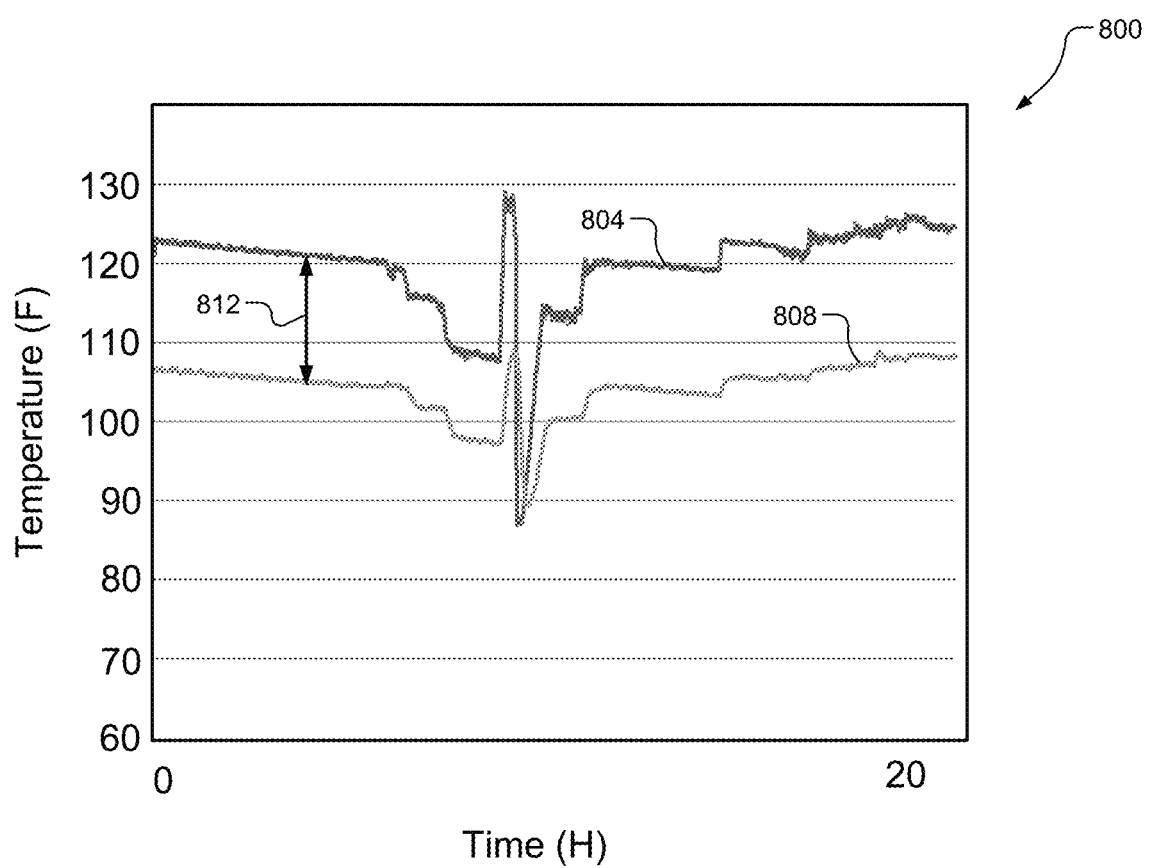

FIGS. 10A, and 10B are schematic representations of smart energy controlled water heaters according to the principles of the present disclosure;

FIG. 11 is a schematic representation of a smart energy control module according to the principles of the present disclosure;

FIG. 12 is a sensed current provided to a smart energy controlled water heater according to the principles of the present disclosure;

FIG. 13 is a DC control module according to the principles of the present disclosure;

FIG. 14 is a water heater including an electrical junction box according to the principles of the present disclosure;

FIG. 15 is a water heater including a smart energy control module mounted on the water heater according to the principles of the present disclosure;

FIG. 16 shows an exemplary control module mounted on a water heater according to the principles of the present disclosure;

FIG. 17 shows the exemplary control module mounted on the water heater with an external temperature sensor according to the principles of the present disclosure; and FIG. 18 illustrates an exemplary relationship between an actual water temperature and a sensed temperature provided by the external temperature sensor.

DETAILED DESCRIPTION

Example embodiments will now be described more fully with reference to the accompanying drawings.

With reference to the figures, an electric water heater 10 is provided and includes a control module 12. The control module 12 adjusts an effective capacity of the electric water heater 10 by continuously monitoring and adjusting a set point temperature of the water heater 10 until an optimum effective capacity of the electric water heater 10 is achieved. As used herein, the term module refers to an application specific integrated circuit (ASIC), an electronic circuit, a processor (shared, dedicated, or group), and memory that execute one or more software or firmware programs, a combinational logic circuit, and/or other suitable components that provide the described functionality.

The set point temperature is a consumer-selected input and is generally defined as the maximum temperature that the consumer selects for the heated water that exits the water heater 10. The effective capacity of the water heater 10 is generally defined as the ability of the water heater 10 to provide a volume of water at a "delivered temperature." The delivered temperature is the temperature of the water as used by the consumer at a fixture. The delivered temperature of the water is generally lower than the set point temperature because the delivered temperature is usually achieved by mixing water from the water heater 10 at the set point temperature with cold water from the building water supply.

The effective capacity of the water heater 10 is directly related to the set point temperature as follows: the higher the set point temperature, the lower the volume of hot water that is necessary to be mixed with the cold water to produce the water at the fixture at the delivered temperature. Conversely, the lower the set point temperature, the higher the volume of hot water that is necessary to be mixed with the cold water to produce the water at the fixture at the delivered temperature. Therefore, there is a direct correlation between the set point temperature and the effective capacity of the water heater 10.

The control module 12 monitors and controls the effective capacity of the water heater 10 by selectively adjusting the consumer-selected set point temperature. In so doing, the control module varies the effective capacity of the water heater 10 to meet the specific needs of the consumer. By adjusting the effective capacity of the water heater 10 to meet the demand of the consumer, the control module 12 is able to minimize energy consumption of the water heater 10 while maintaining the ability to produce a satisfactory volume of hot water for the consumer.

Figure 1:
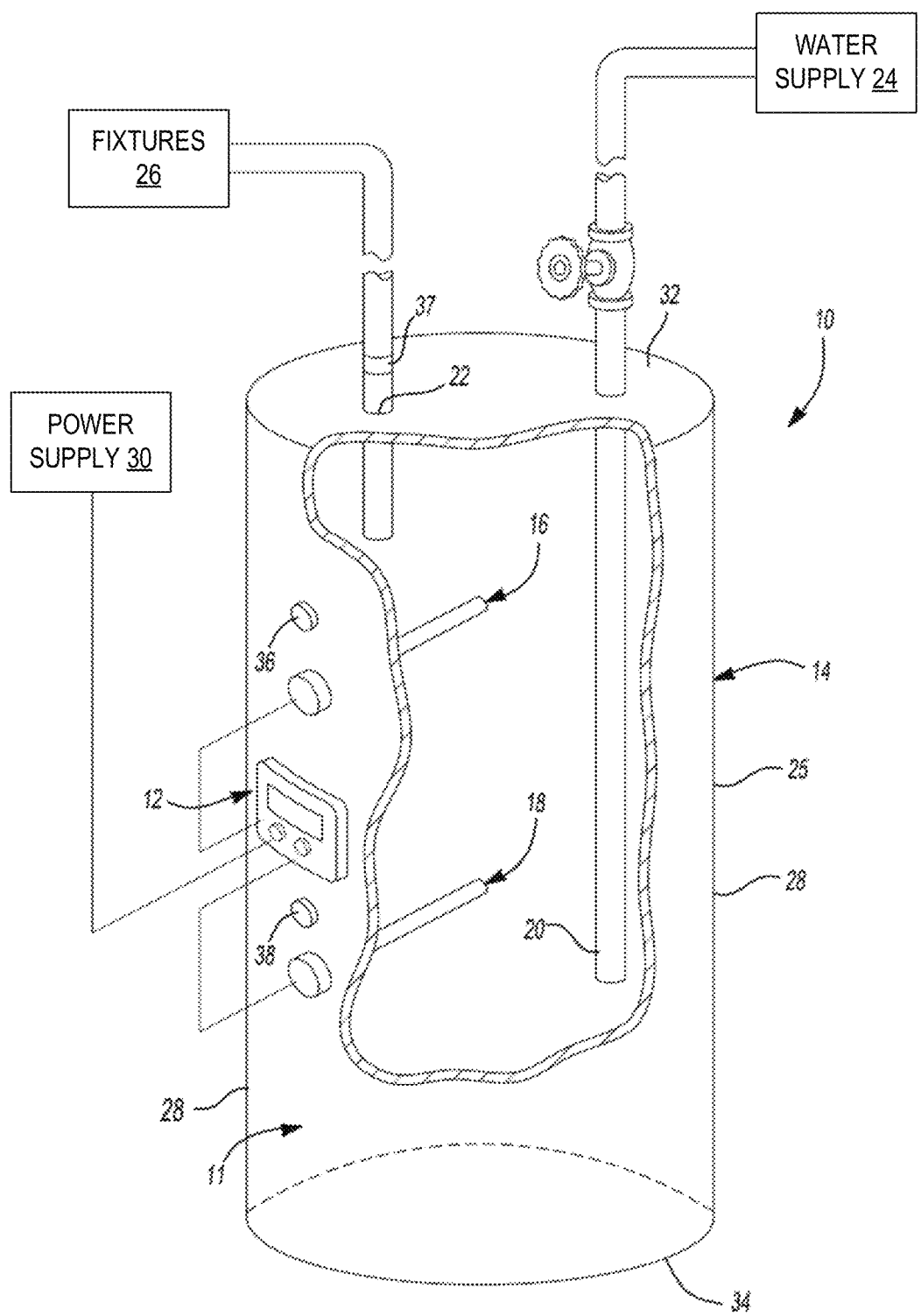
FIG. 1 is a schematic representation of an electric water heater that is operated in accordance with the principles of the present disclosure.

With reference to FIG. 1, the electric water heater 10 is shown to include a tank 14, an upper heating element 16, and a lower heating element 18. The tank 14 defines an interior 11 having a volume and includes an inlet 20 and an outlet 22, both fluidly coupled to the interior 11. The inlet 20 is also fluidly coupled to a water supply 24, while the outlet 22 is also fluidly connected to the hot water pipes leading to the building fixtures, such as faucets, showers, dishwashers, and clothes washers, etc., which are schematically represented at 26. The inlet 20 receives a constant supply of cold water under pressure from the building water supply 24 such that the interior 11 of the tank 14 is always full of water. Hot water only exits the tank 14 through the outlet 22 when a demand for hot water is made at one of the fixtures 26 throughout the building. Cold water, therefore, only enters the tank 14 when hot water exits the tank 14 through the outlet 22.

The upper heating element 16 and the lower heating element 18 each extend through a side wall 25 of the tank 14 and generally into the interior 11. The upper heating element 16 is disposed near an upper wall 32 of the tank 14. The lower heating element 18 is disposed near a lower wall 34 of the tank 14. The lower heating element 18 is generally closer to the lower wall 34 of the tank 14 than the upper heating element 16 is to the upper wall 32.

The upper and lower heating elements 16, 18 receive current from a power supply 30 via the control module 12. The control module 12 regulates each of the upper and lower heating elements 16, 18 between an ON state and an OFF state.

The electric water heater 10 also includes a sensor module 35 (see, FIG. 8) in communication with the control module 12. The sensor module 35 comprises an upper temperature sensor 36 and a lower temperature sensor 38, each in communication with the control module 12. Outputs from the upper and lower temperature sensors 36, 38 which correspond to their respective temperature readings are monitored by the control module 12.

The upper temperature sensor 36 is disposed adjacent to the upper heating element 16 to monitor a temperature of water within the tank 14 in an upper zone (i.e., generally between the upper heating element 16 and the upper wall 32). The lower temperature sensor 38 is disposed adjacent to the lower heating element 18 to monitor a temperature of water within the tank 14 in a middle zone (i.e., generally between the lower heating element 18 and the upper heating element 16). The temperature sensors 36, 38 are preferably thermistors, such as NTC thermistors, but could be any suitable temperature sensor that can accurately and reliably provide an output which is indicative of the temperature of the water residing within the tank 14 near the sensor.

In addition to the foregoing, the sensor module 35 could also comprise two or more upper temperature sensors 36 disposed near the upper heating element 16. Such an arrangement would provide redundant temperature readings at the upper heating element 16. In a device having such an arrangement, the control module 12 would monitor the output from the plurality of sensors 36 and the sensor output indicative of the highest measured temperature would be used to control the operation of the upper heating element 16. In addition, the control module 12 can compare the respective outputs from the sensors 36 for a self-diagnostic procedure. For example, if the difference between the output of any two sensors 36 is above a predetermined threshold value, the control module 12 could detect a sensor fault and require that the water heater 10 be shut down for maintenance or repair.

Further, the sensor module 35 could also include a flow sensor 37 disposed at the inlet 20 or the outlet 22 of the tank 14. The flow sensor 37 could monitor a flow of water entering or exiting the tank 14. Therefore, output from the flow sensor 37 could be used by the control module 12 to control the operation of the upper and lower heating elements 16, 18. The flow sensor 37 could also be used to determine the volume of water that has been drawn from the water heater 10 over a period of time.

Figure 2:
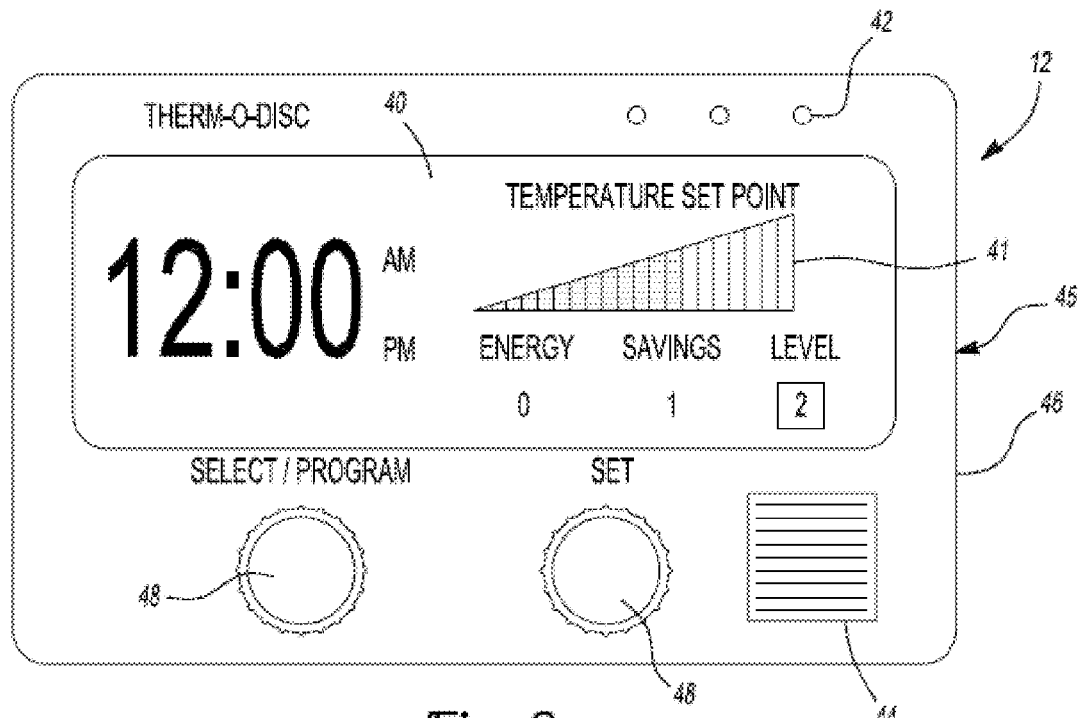
FIG. 2 is a schematic representation of a consumer interface module of the electric water heater of FIG. 1.

Referring now to FIG. 2, the control module 12 includes a consumer interface module 45 having a liquid crystal display (LCD) 40, a series of light-emitting devices (LEDs) 42, and a speaker 44, all contained within a control module housing 46. The LCD 40 displays the operating parameters of the electric water heater 10 such as the set point temperature (see bar graph 41 of FIG. 2), an energy savings level (e.g., 0, 1 or 2), actual energy savings (e.g. in energy or dollars saved), available hot water, and other useful information such as the date and time. In addition, the LCD 40 may be backlit to allow use of the control module 12 in a dark or dimly-lit basement. The LEDs 42 are positioned adjacent to the LCD 40, but may also be incorporated into the LCD 40 to visually indicate operating parameters of the electric water heater 10. The speaker 44 allows the control module 12 to audibly alert a consumer of a particular condition of the water heater 10. In addition to the foregoing, the control module 12 also includes at least user-input device 48 (e.g., a button) to enable the consumer to communicate with the consumer interface 45. The user-input devices 48 may include, but are not limited to, set point control, programming, opt in/out, and/or vacation buttons.

Figure 3A:
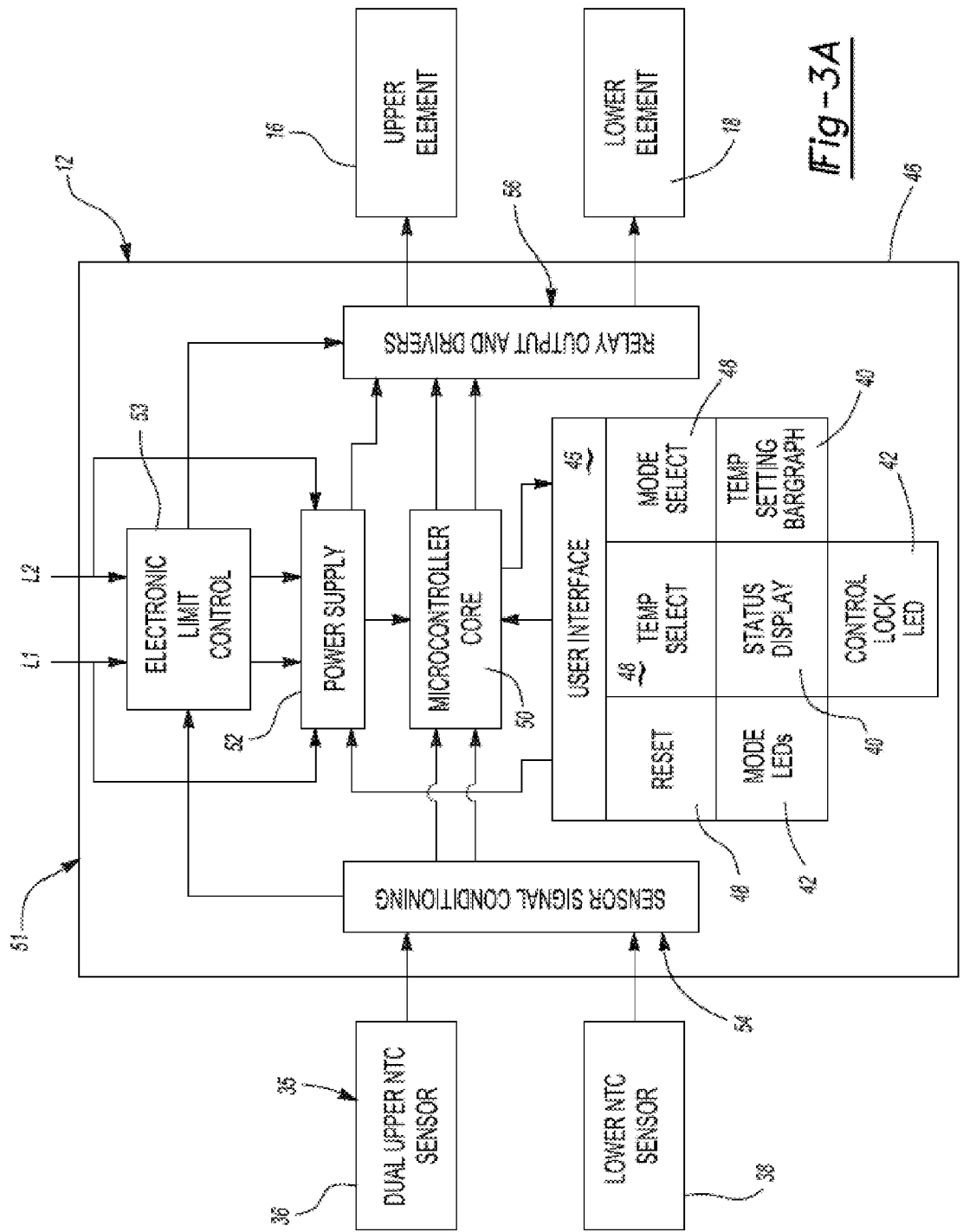
FIG. 3A is a schematic representation of a control module incorporating an electronic upper limit sensor for an electric water heater in accordance with the principles of the present disclosure.

Turning to FIG. 3A, the control module 12 also comprises a microcontroller 50 in communication with the sensor module 35 and the consumer interface module 45. The microcontroller 50 is powered by a power supply 52 disposed generally within the control module housing 46. The power supply 52 receives power from line voltages L1, L2.

Figure 3B:
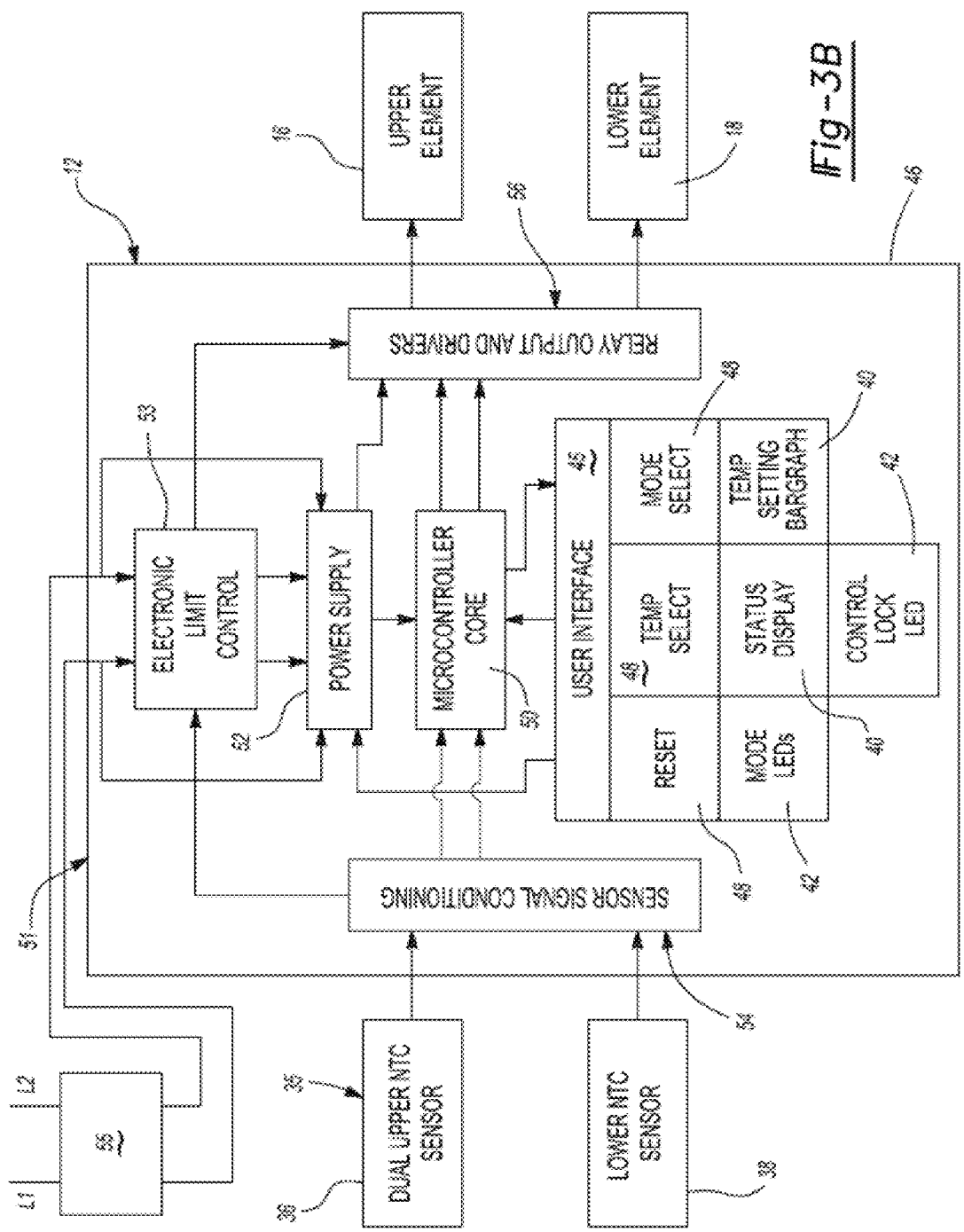
FIG. 3B is a schematic representation of a control module incorporating a bimetal upper limit switch and electronic upper limit sensor for an electric water heat in accordance with the principles of the present disclosure.

A limit control module 51 controls power to the heating elements 16, 18 based on readings from the upper and lower temperature sensors 36, 38. The limit control module 51 of FIG. 3A is shown as an electronic limit control module 53 and essentially acts as a backup device to the microcontroller 50. For example, if the microcontroller 50 fails to cut power to the upper and lower heating elements 16, 18, the electronic limit control module 53 shuts down the heating elements 16, 18 based on readings from the upper and lower temperature sensors 36, 38. The limit control module 51 could also include a bimetal snap disc thermostat 55, as shown in FIG. 3B. The bimetal snap disc thermostat 55 receives line voltages L1, L2 and selectively prevents power from reaching the upper and lower heating elements 16, 18.

In either of the foregoing configurations, the limit control module 51 is a separate circuit from the microcontroller 50 and selectively cuts power to the upper and lower heating elements 16, 18 based on readings from the upper and lower temperature sensors 36, 38. The limit control module 51 only cuts power to the upper and lower heating elements 16, 18 when the microcontroller 50 fails to do so based on readings from the upper and lower temperature sensors 36, 38.

The microcontroller 50 is also in communication with a sensor conditioning module 54 and a relay output and driver module 56. The sensor conditioning module 54 receives the output from the respective temperature sensors 36, 38 and directs the output to the microcontroller 50 and electronic limit control module 51. The relay output and driver module 56 receives event messages from the microcontroller 50 based on input from the upper and lower temperature sensors 36, 38 to toggle the upper and lower heating elements 16, 18 between the ON state and the OFF state by selectively allowing line voltage L1, L2 to supply current to the respective heating elements 16, 18.

Operation of the electric water heater 10 and associated control module 12 is best understood with reference to FIGS. 4-7. Generally speaking, the control module 12 monitors the consumer's hot water usage over time and provides an effective capacity for only the amount of hot water that is actually needed. The control module 12 can reduce the effective capacity by reducing a consumer-selected set point temperature by a setback value and recommend a reduction in the consumer-selected set point temperature if further reductions to the set point temperature are not possible. The control module 12 can increase the effective capacity by recommending an increase in set point temperature. In this manner, the control module 12 is able to tailor the effective capacity of the water heater 10 to the actual hot water consumption of the consumer.

When the water heater 10 is initially installed, the tank 14 is completely filled with cold water from the building water supply 24 via the inlet 20. At this point, all of the water within the tank 14 is substantially at the same temperature (i.e., cold). The consumer selects a set point temperature setting at the consumer interface 45 by depressing one of the buttons 48. The set point temperature represents the temperature of the water that the control module 12 seeks to achieve in the tank 14 within a tolerance. The tolerance recognizes that the actual water temperature within the tank may be different from the measured temperature provided by sensors 36, 38. The set point temperature can be set, for example, to one of twenty temperature settings. The twenty settings are exemplified by the bar graph of FIG. 2, though more or fewer temperature settings could be used. The respective temperature settings provide the control module 12 adjusts the effective capacity of the water heater 10.

In addition to selecting the desired set point temperature, the consumer is also able to select a desired energy savings setting, for example 0—No Energy Savings, 1—Moderate Energy Savings, or 2—Aggressive Energy Savings. Selecting an energy level provides the control module 12 with the ability to adjust the consumer set point temperature to tailor effective capacity. The energy savings levels are exemplified by levels 0, 1, 2 (FIG. 2) but could include additional energy savings levels. The consumer selects the respective energy savings setting at the consumer interface 45 by depressing one of the buttons 48.

The first energy savings setting, 0—No Energy Savings, does not allow the control module 12 to lower the consumer-selected set point temperature. The second energy savings level, 1—Moderate, allows the control module 12 to lower the consumer-selected set point temperature by an initial setback value. Thus, the temperature to which the water in the water heater 10 will be heated is the control set point temperature, i.e., the consumer-selected set point temperature minus the initial setback value. As already described, a lower water temperature in the tank 14 reduces the effective capacity of the electric water heater 10. At the reduced set point temperature, the consumer draws more hot water from the tank 14 in order to obtain water at a desired temperature. Energy savings, though, is realized because the entire volume of water in the tank 14 is heated to a lower temperature.

The third energy savings setting, 2—Aggressive, similarly allows the consumer-selected set point temperature to be lowered by the initial setback value. In addition, the second energy savings setting allows the control module 12 to lower the set point temperature still further, by up to a maximum setback value. With the maximum setback value, the control module 12 can further reduce the effective capacity of the water heater 10 in an effort to optimize the energy efficiency of the water heater 10 based on consumer demand for hot water.

Once the consumer selects a set point temperature and energy savings setting, the control module 12 initially controls the water heater 10 based on the respective consumer inputs (i.e., set point temperature and energy savings setting).

In operation, the control module 12 first determines the control set point temperature based on the initial setback value. Note that regardless of which energy savings level is selected (i.e., 1 or 2), the control module 12 initially sets the control set point temperature to a value equal to the consumer-selected set point temperature minus the initial setback value, unless the energy savings level chosen is 0—No Energy Savings. In so doing, the control module 12 generates a control set point temperature that is lower than the consumer-selected set point temperature, reducing the effective capacity of the water heater 10. With the control set point temperature determined, the control module 12 then controls the function and operation of the electric water heater 10 as previously described.

Once the water heater 10 is at the control set point temperature the control module 12 monitors hot water consumption by the consumer. By monitoring the upper heating element 16, the control module 12 is able to react to hot water usage and adjust effective capacity. As previously discussed, the upper heating element 16 is only energized during a deep draw event when the incoming cold water contacts the upper temperature sensor 36. Therefore, the control module 12 is able to determine that the water heater 10 has excess effective capacity when the upper heating element 16 has not been energized for a predetermined period. In addition, the control module 12 is able to determine that there is a need for additional effective capacity if the upper heating element 16 has been energized for a predetermined period.

It should be noted that the predetermined amount of time is generally referred to as a "cycle" and is usually at least one week in duration to allow for a week's worth of household events that may give rise to a deep draw event such as, for example, laundry day. The control module 12 may also collect usage data to generate historical usage data (i.e., water usage over time). The control module 12 may then utilize the collected historical data to develop usage patterns. The usage patterns may be used by the control module 12 in anticipating setback temperatures for different times of day or days of the week. In this manner, the control module 12 may control the capacity of the water heater 10 based on historical information to prepare for certain household events.

For example, if laundry day falls on Thursday for three consecutive weeks, the control module 12 may increase the effective capacity of the water heater 10 on Wednesday night in anticipation of laundry day. Conversely, if a consumer is routinely away from home on Saturdays and Sundays, the water heater 10 may reduce the effective capacity on Friday night. Therefore, the control module 12 may be used to tailor energy consumption based on consumer water usage and may collect data to anticipate future water usage.

If the control module 12 determines that there is excess effective capacity in the water heater 10, the control module 12 will take one of two actions. First, if the energy savings setting is set to level 1, the control module 12 must continue to control the water heater at the consumer-selected set point temperature minus the initial setback value. If conditions warrant a further decrease in effective capacity, however, the control module 12 alerts the consumer via consumer interface module 45 to change the energy savings setting from level 1 to level 2. Second, if the energy savings setting is set to level 2, the control module 12 lowers set point temperature by the maximum set back value to further reduce the effective capacity of the water heater 10. However, the control module 12 is only permitted to reduce the set point temperature by the maximum setback value.

Conversely, if the control module 12 determines that there is not enough effective capacity in the water heater 10, the control module 12 increases the effective capacity by raising the control set point temperature, but is limited in doing so by the consumer-selected set point temperature.

Figure 4:
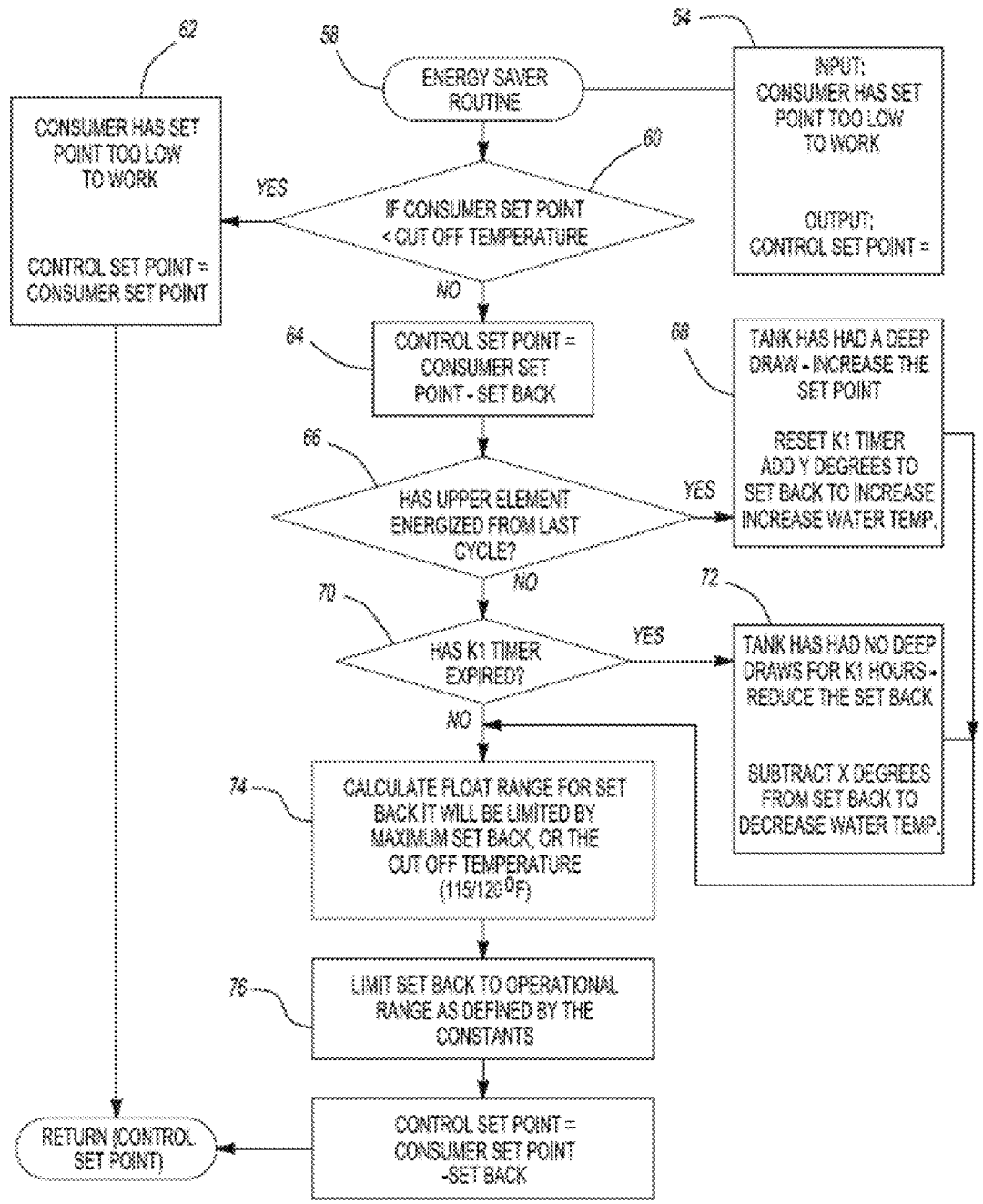
FIG. 4 is a flowchart that describes the operation of an energy saver module for an electric water heater in accordance with the principles of the present disclosure.

FIG. 4 details an exemplary savings module 58 for use by the control module 12 for determining when an increase or a decrease in effective capacity is warranted. The energy savings module 58 utilizes the control module 12 and associated sensor module 35 to tailor the effective capacity of the water heater 10 to the specific needs of the individual consumer by continuously monitoring the consumer's hot water usage. Initially, the control module 12 compares the consumer-selected set point temperature to a threshold cutoff temperature, which is too low to allow operation of the energy savings module 58 (i.e., a setback from the consumer-selected set point temperature would result in a cold water condition). In one exemplary embodiment, the cutoff temperature is between 115 degrees Fahrenheit and 120 degrees Fahrenheit. Therefore when the consumer-selected set point temperature is lower than the cutoff temperature (i.e., 115-120 degrees Fahrenheit), the energy savings module 58 sets the control set point temperature at the consumer-selected set point temperature at 62 as the control module 12 cannot setback the temperature lower than 115 degrees Fahrenheit. At this point, the control module 12 maintains the water disposed within the tank 14 at the consumer-selected set point temperature by selectively toggling the upper and lower heating elements 16, 18 between the ON and OFF states.

If the consumer-selected set point temperature is above the cutoff temperature, the control module 12 reduces the consumer-selected set point temperature by the initial setback amount to the control set point temperature at 64. Once the control set point temperature is determined, the control module 12 maintains the water within the tank 14 at the control set point temperature by selectively toggling the upper and lower heating elements 16, 18 between the ON and OFF states.

The control module 12 controls the water heater 10 at the control set point temperature for one cycle (i.e., at least one week). The control module 12 monitors the sensor module 35 to determine if the upper heating element 16 has been energized during the cycle at 66. If the upper heating element 16 has been energized during the cycle, the control module 12 concludes that the water heater 10 has experienced a deep draw event and requires additional effective capacity at 68. However, if the upper element 16 has not been energized during the cycle, the control module 12 references a timer to determine whether the cycle has expired at 70. If the timer has expired (indicating that the cycle has ended), the control module 12 concludes that the water heater 10 has not experienced a deep draw event within the last cycle at 72. At this point, the control module 12 concludes that the set point temperature should be further reduced to decrease the effective capacity of the water heater 10.

The control module 12 determines a float range for the setback value based on whether the upper heating element 16 has been energized during the last cycle at 74. The float range defines an amount the control module 12 is allowed to either increase or decrease the set point temperature to effectuate a change in effective capacity. The control module 12 is limited in implementing the float range by the maximum setback value as the control module 12 is not permitted to reduce the consumer-selected set point temperature more than the maximum setback value at 76. In addition, the control module 12 is limited by the cutoff temperature (i.e., 115-120 degrees Fahrenheit).

If the control module 12 determines that additional energy savings are possible because the upper heating element 16 has not cycled for a predetermined time, or that the water heater 10 is not producing enough hot water to keep up with demand (i.e., the upper heating element 16 is regularly cycled ON), the control module 12 alerts the consumer. The control module 12 notifies the consumer that at least one of the set point temperature setting or the energy savings level should be adjusted to allow the control module 12 the flexibility to optimize performance of the water heater 10. The control module 12 recommends such action through use of a performance monitoring module 78 to rectify an over capacity or an under capacity situation.

Figure 5:
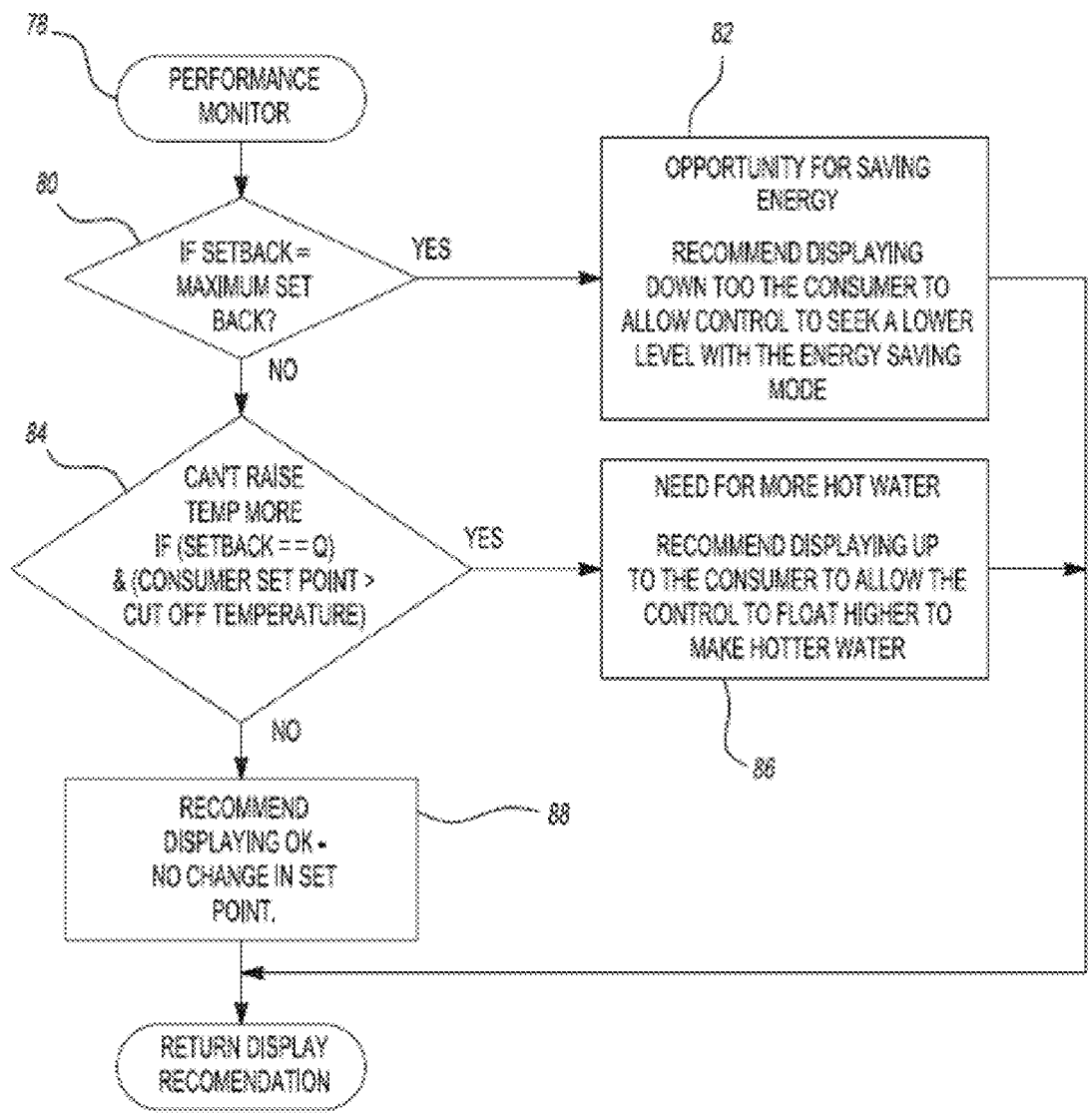
FIG. 5 is a flowchart that describes the operation of an electric water heater in accordance with the principles of the present disclosure.

With particular reference to FIG. 5, operation of the performance monitoring module 78 is described. The performance monitoring module 78 generates a recommendation to the consumer to save energy by selecting a lower set point temperature or generates a recommendation to the consumer to increase the set point temperature based on hot water demand history. For example, if the setback value is equal to the maximum setback value, the control module 12 cannot further reduce the consumer-selected set point temperature even if there is excess effective capacity in the water heater 10. Therefore, the only way for the control module 12 to reduce the effective capacity of the water heater 10 is to start at a lower consumer-selected set point temperature. Therefore, the control module 12 must alert the consumer that the consumer-selected set point temperature should be adjusted.

The control module 12 first determines if the setback value equals the maximum setback value at 80. If the setback value equals the maximum setback value, and the upper heating element 16 has not cycled ON for a predetermined period of time, the control module 12 recommends to the consumer via the LCD 40, LED 42, and/or speaker 44 that the consumer-selected set point temperature should be reduced to realize further energy savings at 82. If the consumer reduces the set point temperature, the control module 12 is able to further reduce the effective capacity of the water heater 10 by calculating the control set point temperature from a lower consumer-selected set point temperature. Such a reduction in effective capacity ultimately saves the consumer energy as excess water is not needlessly heated. In this manner, even though the control module is restricted from reducing the consumer-selected set point temperature by the maximum setback value, the control module 12 can still further reduce the effective capacity of the water heater 10.

If the setback amount is zero, and the upper heating element 16 has been cycled ON during a previous period, the control module 12 determines that an increase in effective capacity is necessary at 84. At this point, the control module 12 alerts the consumer of the need for additional effective capacity at 86 and recommends increasing the consumer-selected set point temperature via the LCD 40, LED 42, and/or speaker 44. If the control module 12 is able to properly control the effective capacity of the water heater 10 based on hot water demand and consumer-selected input, the control module 12 displays that the system is functioning within its limits and is able to sufficiently optimize the effective capacity of the water heater 10 at 88.

In each of the foregoing situations, the control module 12 must alert the consumer to either raise or lower the consumer-selected set point if the maximum setback is achieved. The control module 12 makes such recommendations through a consumer interface display module 90.

Figure 6:
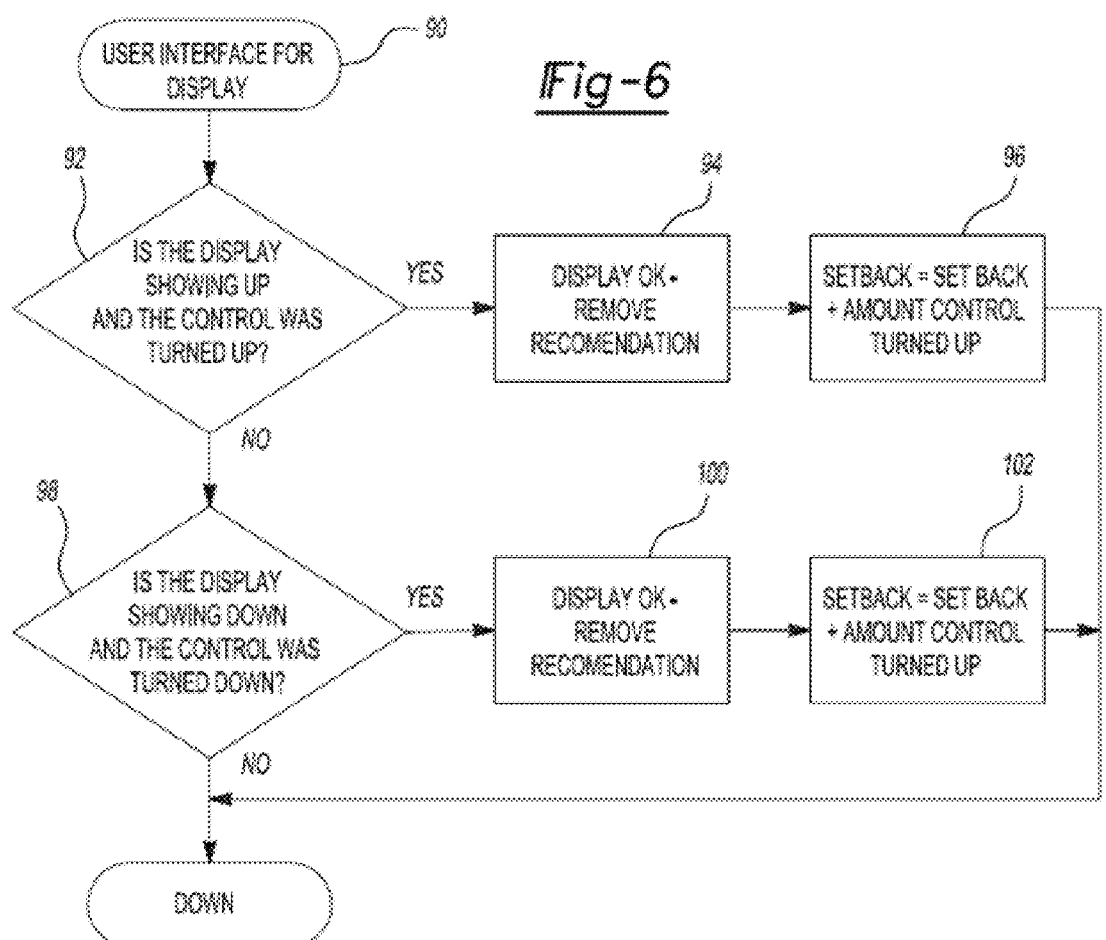
FIG. 6 is a flowchart that illustrates operation of a consumer interface module for an electric water heater controller in accordance with the principles of the present disclosure.

The consumer interface display module 90 for use with the above-described performance monitoring module 78 is shown in FIG. 6. The consumer interface display module 90 determines whether the LCD 40 recommends an increase in the consumer-selected set point temperature and whether the consumer has acted on the recommendation 92. If the consumer has acted on the recommendation, the recommendation is removed and the display 40 notes that the system is functioning within limits. At this point, the control module 12 sets the setback value to be generally equal to the initial setback value plus the amount that the consumer-selected set point temperature was increased 96.

Similarly, the consumer interface display module 90 determines whether the LCD 40 recommends a decrease in the consumer-selected set point temperature and whether the consumer has acted on the recommendation 98. If the consumer has acted on the recommendation, the recommendation is removed and the display 40 that the system is functioning within limits and is able to sufficiently optimize the effective capacity of the water heater 10 at 100. At this point, the control module 12 sets the setback value to be generally equal to the initial setback value minus the amount that the consumer-selected set point temperature was decreased 102.

It should be noted that for the consumer interface display module 90, the consumer's acting on the recommendation (i.e., to raise or lower the set point temperature range) does not immediately change the temperature of the water disposed within the tank 14. Following the recommendation simply shifts the control module's 12 operational limits so that the control module 12 has greater flexibility to further adjust the effective capacity of the water heater 10 when necessary in view of hot water demand history, thereby realizing greater energy efficiency.

Figure 7:
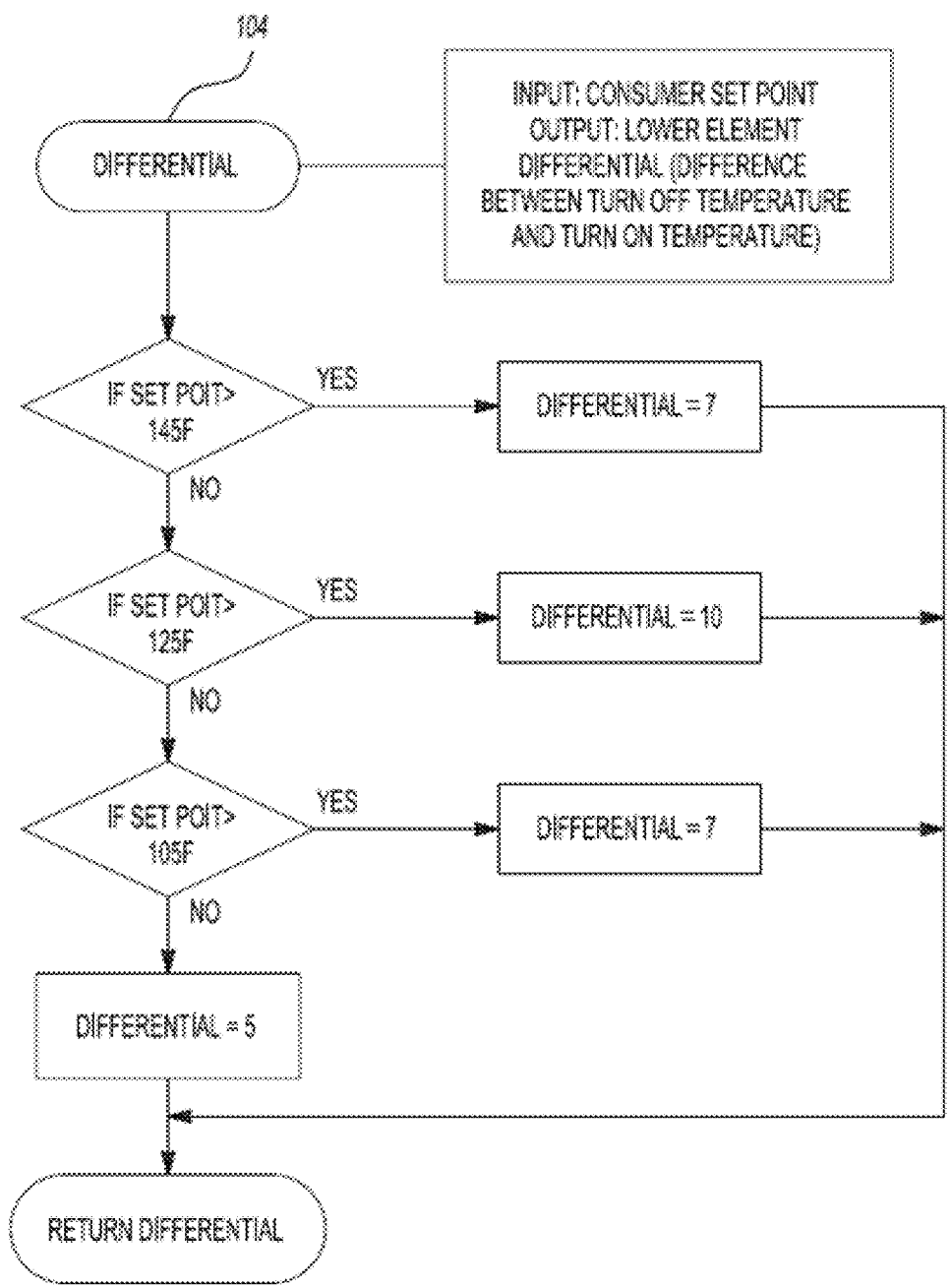
FIG. 7 is a flowchart that describes the operation of a water temperature differential module in accordance with the principles of the disclosure.

The control module 12, by optimizing effective capacity of the water heater 10, allows more hot water to be available at lower set point temperatures, as demonstrated by the differential module 104 of FIG. 7.

During periods of non-use, the temperature of water within the tank 14 will fall due to heat escaping through tank walls. Therefore, maintaining the tank 14 at a lower temperature reduces energy loss. At lower set point temperatures, the water within the tank 14 is only allowed to vary from the set point temperature a small amount to increase the average temperature of the tank 14. Reducing the operating range of the tank 14 at lower set point temperatures ensures that there is enough hot water within the tank 14 to deliver water at a comfortable temperature (i.e., the delivered temperature).

For higher set point temperatures, the differential module 104 allows a wider temperature differential (i.e., 12° F.) between the set point temperature and the temperature of the water at which the heating elements 16, 18 are energized. For lower temperatures, the differential module 104 allows a narrower temperature differential (i.e., 7° F.). This relationship allows more hot water to be available at lower set point temperatures. For example, a set point temperature of 145° F. requires a differential of 12° F., thereby allowing the water to range between 133° F. and 157° F. A set point temperature of 105° F. requires a differential of 7° F., thereby allowing the water to range between 98° F. and 112° F.

Each degree lost by the water heater 10 during non-use has a greater impact in reducing effective capacity at lower set point temperatures than at higher set point temperatures. Maintaining the temperature of the water close to the set point temperature allows more hot water to be available.

Therefore, by controlling the effective capacity of the water heater 10 to a state that minimizes the set point temperature (i.e., by reducing the consumer-selected set point temperature by the setback value), more hot water is available at lower set point temperatures and energy is saved.

Figure 8:
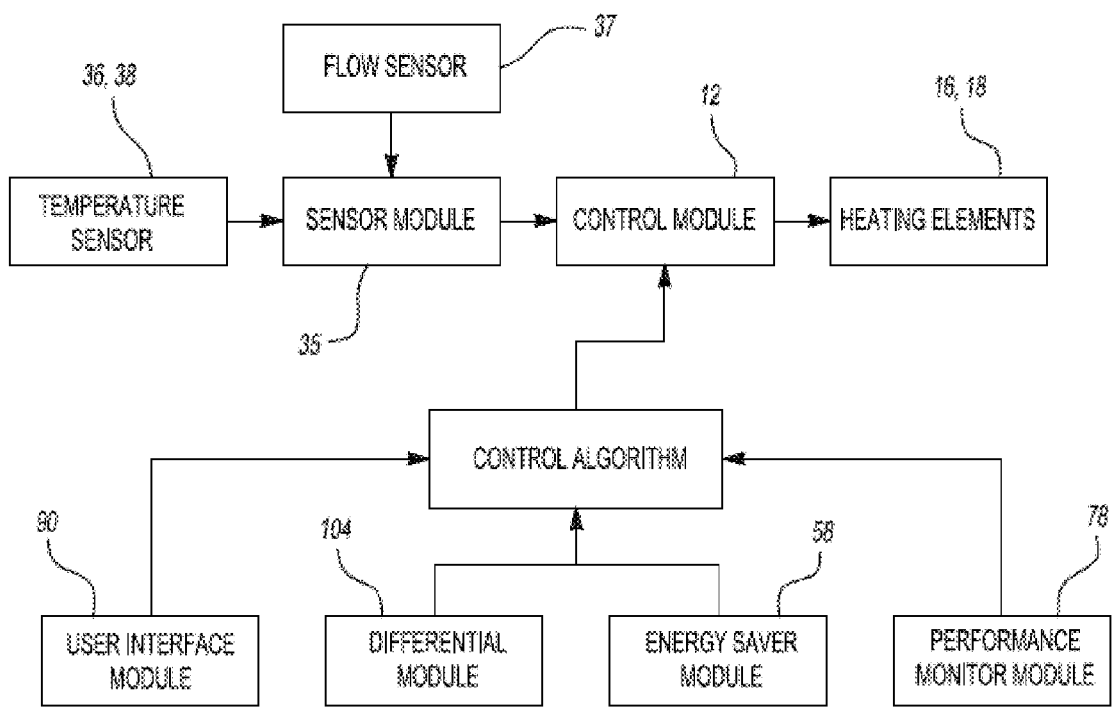
FIG. 8 is a schematic representation of a control system for a hot water heater according to the disclosure and incorporating a sensor module, a control algorithm, and a control module.

FIG. 8 schematically represents the relationship between the control module 12, sensor module 35, energy savings module 58, performance monitoring module 78, user interface module 90, and differential module 104. Each of the modules 35, 58, 78, 90, 104 communicate with the control module 12 to aid the control module 12 in continuously adjusting the set point temperature of the water heater 10 until the effective capacity and energy use are optimized.

Figure 9:
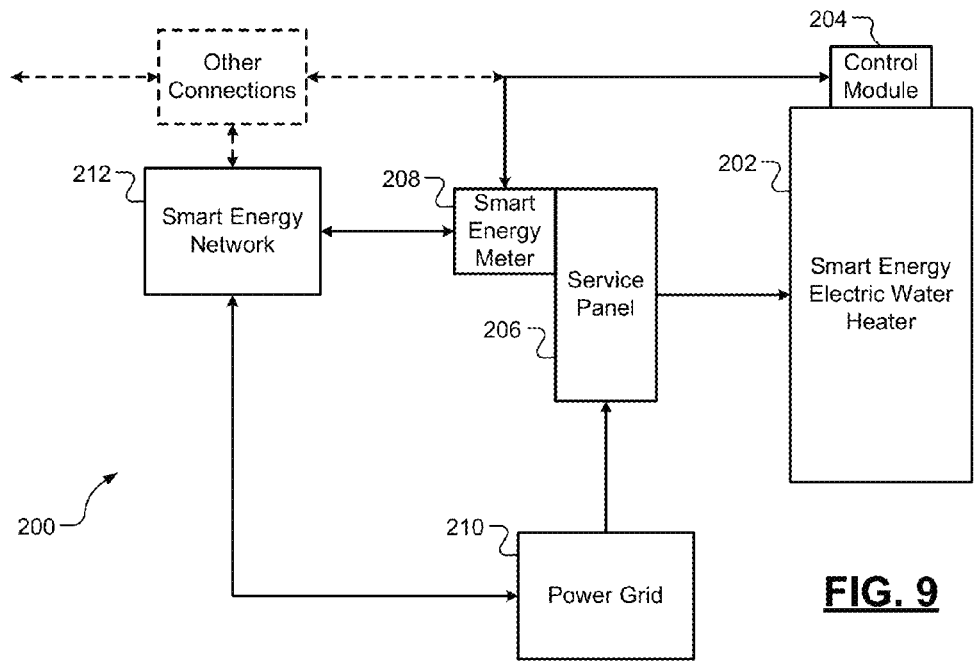
FIG. 9 is a schematic representation of a smart energy controlled water heater system according to the principles of the present disclosure.

Referring now to FIG. 9, a smart energy controlled water heater system 200 is shown schematically to include an electric water heater 202 (including a control module 204), a service panel 206 (that includes, for example, a circuit breaker panel), and a smart energy meter 208. The electric water heater 202 receives electrical power from a power grid 210 via the service panel 206. The smart energy meter 208 measures the amount of electrical energy consumed by the electric water heater 202 and other household devices (not shown).

The smart energy meter 208 communicates electrical energy consumption data to a smart energy network 212. The smart energy network 212 monitors the electrical energy consumption of the household for billing purposes. Further, the smart energy network 212 monitors total electrical energy consumption of the power grid 210 for various smart energy applications, including, but not limited to, peak usage information, load shedding, availability of renewable energy, and/or pricing. The smart energy meter 208 communicates with the smart energy network 212 via a wired or wireless communication network. Similarly, the smart energy meter 208 may communicate with the control module 204 via wired or wireless communication. For example only, the smart energy meter 208 and/or the control module 204 may wirelessly communicate according to the ZigBee communication protocol specification, which is based on the IEEE 802.145.4-2003 standard, or any other suitable wireless home area network (WHAN) or wireless personal area network (WPAN) protocol (e.g. Bluetooth). The system 200 may also include other connections 214 for providing communication between the control module 204 and the smart energy network 212. For example, the other connections 214 may include, but are not limited to, a home area network (HAN) to wide area network (WAN) gateway (e.g., a WiFi connection), a cellular to cloud connection, and/or a UHF connection.

More specifically, the control module 204 of the present disclosure may include a communication module 206 that communicates with the smart energy meter 208. As shown, the control module 204 is located on an upper portion of the water heater 202 to facilitate both communication with the smart energy meter 208 and control of power delivered to the water heater 202 from the service panel 206, though other arrangements of the control module 204 are anticipated. The communication module 206 may monitor and record usage information of the water heater 202 to determine both hot water and electrical power consumption associated with the water heater 202. For example, the communication module 206 may determine which times correspond to peak usage of the water heater 202 and which times correspond to little or no usage of the water heater 202. Although the control module 204 and/or the communication module 206 are described as monitoring and recording the usage information, any other suitable component may provide these functions. For example only, the smart energy meter 208 or another component of the system 200 may monitor and record the usage or other information.

Further, the communication module 206 communicates with the smart energy meter 208 to receive energy information associated with the power grid 210 from the smart energy network 212. For example, the smart energy meter 208 may transmit power grid usage (e.g. the peak usage information and other alerts associated with power grid usage), load shedding, availability of renewable energy, and/or pricing information to the communication module. The control module 204 optimizes operation of the water heater 202 based on the usage information of the water heater 202 and the energy information received from the smart energy meter 208. For example, the control module 204 may power the water heater 202 on and off according to the energy information received from the smart energy meter 208.

Referring now to FIGS. 10A and 10B, the electric water heater 202 and the control module 204 are shown. The control module 204 may include and implement any of the features described with respect to the control module 12 (as shown in FIG. 2), as well the corresponding description for FIGS. 1-8. The control module 12 further includes the communication module 206.

The control module 204 receives line voltages L1, L2 and controls power supply and operation of the electric water heater 202. The electric water heater 202 includes an upper heating element 220 and a lower heating element 222. For example, the upper heating element 220 and the lower heating element 222 may be selectively energized to heat the water in the electric water heater 202 according to principles of the present disclosure described in FIGS. 1-8. The control module 204 selectively provides current from the line voltages L1, L2 to the upper heating element 220 via a switching module (e.g. relay 224) and a thermostat 226. For example, when the relay 224 is closed and the thermostat 226 is in a first position, the upper heating element 220 is energized. Conversely, when the relay 224 is open or the thermostat 226 is in a second position, the upper heating element 220 is de-energized.

The control module 204 selectively provides the current from the line voltages L1, L2 to the lower heating element 222 via the relay 224 and a thermostat 228 (as shown in FIG. 10A) or via the relay 224 (as shown in FIG. 10B). For example, as shown in FIG. 10A, when the relay 224 and the thermostat 228 are closed and the thermostat 226 is in the second position, the lower heating element 222 is energized. When either the relay 224 or the thermostat 228 is open or the thermostat 226 is in the first position, the lower heating element 222 is de-energized. As shown in FIG. 10B, when the relay 224 is closed and the thermostat 226 is in the second position, the lower heating element 222 is energized. When the relay 224 is open or the thermostat 226 is in the first position, the lower heating element 222 is de-energized.

The water heater 202 as shown in FIG. 10A may be a pre-existing water heater that is modified to include the control module 204 according to the present disclosure. In other words, the water heater 202 may be manufactured and installed in a home and configured to operate according to the thermostats 226 and 228. Subsequently, the water heater 202 may be modified to include the control module 204. The modified water heater 202 is configured to operate according to the control module 204 and the relay 224 in addition to the thermostats 226 and 228. For example only, the control module 204 is installed on an upper portion of the water heater 202 to facilitate connection to the line voltages L1, L2.

Conversely, the water heater 202 as shown in FIG. 10B may be manufactured to include the control module 204 and a sensor 230 (e.g. a thermistor). The control module 204 communicates with the sensor 230 to determine a water temperature in a lower portion of the water heater 202. The control module 204 controls energizing and de-energizing of the lower heating element 222 based on the sensor 230. The sensor 230 may be arranged within a tank of the water heater 202. Conversely, when the water heater 202 is modified to include the control module 204 after manufacture, the sensor 230 may be arranged on an outer surface of the water heater 202.

Further, the water heater 202 as shown in FIG. 10B may include a single thermostat 240 that transitions between the upper heating element 220 and the lower heating element 222. For example, when the thermostat 240 is connected to the lower heating element 222, the lower heating element 222 is energized. Conversely, when the thermostat 240 is connected to the upper heating element 220, the upper heating element 220 is energized.

As shown in each of FIGS. 10A and 10B, the control module 204 includes the relay 224 to control energizing and de-energizing of both the upper heating element 220 and the lower heating element 222 further based on: i) usage information of the water heater 202 collected by the control module 204; and ii) energy information associated with the power grid 210 received from the smart energy meter 208. More specifically, the control module 204 may selectively de-energize both the upper heating element 220 and the lower heating element 222 of the water heater 202 using the relay 224, independently of the operation of the thermostats 226 and 228.

The water heater 202 as shown in each of FIGS. 10A and 10B may include an electrical cut-off (ECO) switch 232 in communication with the upper heating element 220 and the lower heating element 222. The ECO switch 232 may disconnect the upper heating element 220 and the lower heating element 222 from the line voltages L1, L2 under certain conditions. For example, the ECO switch 232 may be configured to disconnect the upper heating element 220 and the lower heating element 222 when the water temperature reaches or exceeds a high temperature threshold.

The water heater 202 may include one or more other sensors that monitor operating characteristics of the water heater 202. The one or more other sensors include, but are not limited to, a water leak sensor 234. Although the water leak sensor 234 is shown located within the water heater 202, the water leak sensor 234 may be arranged in any suitable location in or near the water heater 202. For example, the water leak sensor 234 may be located on a flooring surface external to the water heater 202, and may be any suitable type of sensor. The control module 204 communicates with the water leak sensor 234 to determine whether the water heater 202 is leaking. For example, the water leak sensor 234 may be a separate device that is configured to operate with the control module 204 and connect to the control module 204 using a wired and/or wireless interface. For example only, the water leak sensor 234 may be plugged in to the control module 204 by a user. If a leak is detected using the water leak sensor 234, the control module 204 may notify the user via electronic messaging or any other known remote communication method.

Referring now to FIG. 11, the control module 204 is shown to include the communication module 206, the relay 224, a power supply 300, a relay driver 302, a microcontroller 304, and a user interface 306. Additionally, the control module 204 may include any of the elements described in FIGS. 3A and 3B.

The power supply 300 communicates with the line voltages L1, L2 to provide power to the water heater 202 via the relay 224 (e.g. a 30 amp single pole, double throw relay) at a desired level. The relay may utilize normally closed contacts to ensure the load is on when power is removed. For example only, the power supply 300 is a 3 volt power supply. The relay driver 302 receives control inputs from the microcontroller 304 to selectively energize and de-energize the relay 224 according to desired on/off times for the water heater 202. For example only, the relay driver 302 may be a zero cross, direct drive, charge pump, or other suitable type of driver. The microcontroller 304 receives user inputs from the user interface 306 as described in, for example, FIGS. 3A and 3B, and from the communication module 206.

The microcontroller 304 receives energy information from the smart energy meter 208 via the communication module 206 as described above with respect to FIGS. 10A and 10B. The microcontroller 304 controls the relay driver 302 to actuate the relay 224 based in part on the energy information received from the smart energy meter 208. The microcontroller 304 may store the energy information for the power grid 210 (e.g. peak usage times, available renewable energy, pricing, etc) and usage information for the water heater 202 to optimize operation of the water heater 202 for both cost and energy savings.

For example, the microcontroller 304 may open and close the relay 224 based on a comparison between the energy information and the usage information for the water heater 202. More specifically, the microcontroller 304 may open the relay 224 to de-energize the upper heating element 220 and the lower heating element 222 during peak usage times of the power grid 210, low availability of renewable energy on the power grid 210, low usage times of the water heater 202, times associated with a higher pricing tier, and any combination thereof. For example, it is typically beneficial to utilize renewable resources when they are available. If a certain time corresponds to both a low availability of renewable energy on the power grid 210 and a low usage time of the water heater 202, the microcontroller 304 may open the relay 224 until there is renewable energy available on the power grid 210, at which time the microcontroller 304 may close the relay 224. Further, the microcontroller 304 may open the relay 224 only if there is sufficient hot water in the water heater 202 to satisfy anticipated demand during the upcoming low availability of renewable energy.

In addition, when the microcontroller 304 receives renewable energy information from the smart energy meter 208 via the communication module 206, the microcontroller 304 can estimate energy required to heat the water to the setpoint temperature by using temperature sensor 234, usage information of the water heater 202, or any combination thereof. The microcontroller 304 may then send this estimated energy to the smart energy network 212 via the communication module 206 and smart energy meter 208.

The microcontroller 304 may further be responsive to inputs received from the user interface 306. For example, a user may force the microcontroller 304 to one of open and close the relay 224 in response to information displayed by the user interface 306. In other words, a user may opt to close the relay 224 during times corresponding to higher pricing tiers and/or peak usage in view of anticipated high usage times of the water heater 202. Conversely, a user may opt to open the relay 224 during times corresponding to higher pricing tiers and/or peak usage despite anticipated high usage times of the water heater 202.

Communication between the user and the microcontroller 304 is not limited to the user interface 306. For example, the user may provide inputs to the microcontroller 304 using electronic messaging via a home area network or a thermostat. Conversely, information can be communicated to the user using a local or home display located elsewhere (e.g., the display of a thermostat control), using mailed documentation, and/or using electronic messaging such as e-mail, sms, or a smart phone interface.

In a water heater that is modified to include the control module 204 (e.g., the control module 204 is attached to the water heater 202 after the water heater 202 is installed), the control module 204 may itself monitor, store, and/or determine usage information for the water heater 202. For example, in some implementations, a water heater may already include structure (such as the control module 12 as described in FIGS. 2-8) for determining usage information. Accordingly, in some implementations, the control module 204 may receive the usage information from the control module 12. For example, the control module 12 may include a communication port for communicating, either wirelessly or via a wired connection, with the control module 204.

Conversely, if the control module 204 is installed in a system including a water heater that does not include the control module 12, or if the control module 12 is not configured to communicate the usage information to the control module 204, the control module 204 according to the principles of the present disclosure may monitor various operating characteristics of the water heater 202 to determine the usage information. For example, the control module 204 may include a usage monitoring module 320. The usage monitoring module 320 receives one or more signals from the system 200 to allow the control module 204 to monitor and determine the usage information. Accordingly, the control module 204 may determine the usage information independently of the control module 12.

For example, the usage monitoring module 320 may receive one or more signals from sensors such as a current sensor 322. The current sensor 322 may sense a current through one of the lines L1 or L2. The current may be indicative of energization of a lower heating element (e.g., the lower heating element 222 as shown in FIGS. 10A and 10B) and/or an upper heating element (e.g., the upper heating element 220 as shown in FIGS. 10A and 10B). More specifically, the current may be indicative of a transition from the lower heating element 222 to the upper heating element 220. The usage monitoring module 320 may provide information (e.g., information indicative of time and duration of each energization of the upper heating element 220) to the communication module 206 and/or the microcontroller 304. Accordingly, the usage monitoring module 320 may determine usage information by measuring operating characteristics of the system 200 external to the water heater 202 and/or the control module 12.

The current sensed by the current sensor 322 is indicative of the current provided to the heating elements 220 and 222. As described above, typically the lower heating element 222 is energized to heat the water in the water heater 202. However, during deep draw events, the upper heating element 220 is energized and the lower heating element 222 may be de-energized. Accordingly, for the water heater 202 as shown in FIG. 10B, the thermostat 226 may first be connected to energize the lower heating element 222 during or after a draw event. Subsequently, the thermostat 226 may be connected to the upper heating element 220 to energize the upper heating element 220 during a deep draw event. Consequently, characteristics of the current sensed by the current sensor 322 may be affected. More specifically, the transition of the thermostat 226 from the lower heating element 222 to the upper heating element 220 may result in a detectable event in the sensed current.

Referring now to FIG. 12, a current 400 sensed by the current sensor 322 is shown. For example, the current 400 is an alternating current having a low peak 402 and a high peak 404. When the lower heating element 222 is energized, the current 400 varies periodically between the low peak 402 and the high peak 404. When the thermostat 226 transitions from the lower heating element 222 to the upper heating element 220, a detectable event may occur as shown at 406. Specifically, the current 400 may include a transient surge at 406. The surge may also occur when the thermostat 226 transitions from the upper heating element 220 to the lower heating element 222.

The current sensor 322 senses the surges indicating the transition from the lower heating element 222 to the upper heating element 220 and the transition from the upper heating element 220 to the lower heating element 222. Accordingly, the signals from the current sensor 322 are indicative of usage information such as a time and duration of deep draws. Further, if the current 400 is provided to the water heater 202 without a surge being detected, then the current 400 indicates a time and duration of a short draw. The usage monitoring module 320 determines the usage information from the signals received from the current sensor 322. For example only, the usage monitoring module 320 (or another component of the control module 204) may include a real time clock or other timing device to determine usage patterns associated with the usage information.

The control module 204 may be configured to determine various other characteristics of the water heater 202. For example, the control module 204 may determine a capacity of the water heater 202 based on the usage information and one or more other measured characteristics, including, but not limited to, inlet water temperature (e.g., as measured by a temperature sensor mounted on a cold water supply line), outlet water temperature (e.g., as measured by a temperature sensor mounted on a hot water supply line), wattage (using the measured current and an input voltage to the system 200), and on and off times of the heating elements 220 and 222. The control module 204 may calculate the volume of water drawn from the water heater 202 based on these characteristics. Accordingly, the control module 204 may estimate a capacity of the water heater 202 that is actually used over a given period.

In some implementations, the control module 204 may determine whether temperature sensors are mounted properly on the cold water supply line and the hot water supply line. For example, if the temperature sensors are reversed (i.e., each of the temperature sensors are mounted on the wrong supply line), the corresponding measured temperatures will be outside of an expected range. Specifically, the temperature sensor mounted on the cold water supply line (instead of the hot water supply line) will indicate a temperature that is significantly less than a hot water temperature threshold, and the temperature sensor mounted on the hot water supply line (instead of the cold water supply line) will indicate a temperature that is significantly greater than a cold water temperature threshold. Further, if the cold water supply line does not increase in temperature when the heating elements 220 and 222 are off, or if the hot water supply line does not decrease when the heating elements 220 and 222 are off, then the control module 204 may determine that the temperature sensors are installed improperly. The control module 204 may provide an indication (e.g., via a fault message) that the temperature sensors are installed improperly.

The control module 204 may divide each day into a plurality of periods (e.g., four periods) and assign each of the periods to a usage amount category (e.g., none, low, medium, and high usage categories). The assigned categories correspond to the usage information (including the other measured characteristics, capacity of the water heater, etc.) for each respective period. The control module 204 may further apply a confidence value for each period and the corresponding category. For example, the control module 204 may increase the confidence value if the usage information for a particular period is consistently the same, or decrease the confidence value if the usage information varies by more than a threshold from day-to-day or week-to-week. The control module 204 may operate the relay 224 during a particular period further based on the assigned categories and confidence values.

Referring now to FIG. 13, the control module 204 may include a direct current (DC) control module 500. For example, the usage monitoring module 320 or another component of the control module 204 may include the DC control module 500, or the DC control module 500 may be independent of other components of the control module 204. When the relay 224 is open, power provided to the water heater 202 may be interrupted. Accordingly, the DC control module 500 may include a power source to provide power for certain operations while the relay 224 is open.

Further, when the relay 224 is open, the DC control module 500 allows the control module 204 to continue to determine whether additional hot water is need. For example, the DC control module 500 may continue to monitor transitions of the thermostat 226 even when the relay 224 is open. Accordingly, if the transitions of the thermostat 226 indicate that hot water is needed, the control module 204 can close the relay 224 to resume normal operation of the upper heating element 220 and the lower heating element 222.

The DC control module 500 includes a simplified example detection circuit 502. The detection circuit 502 communicates with the line voltages L1 and L2 and the relay 224. When the relay 224 is open, a DC voltage is generated across capacitor 504, and resistors 506 and 508 limit a current provided to the water heater 202 (e.g., to approximately 2-3 mA).

A voltage across the resistor 508 may be indicative of a transition between the lower heating element 222 and the upper heating element 220. For example, when the thermostat 226 is connected to the lower heating element 222, a small voltage across the resistor 508 may be measured. Conversely, during the transition from the lower heating element 222 to the upper heating element 220, the voltage across the resistor 508 may momentarily decrease (e.g., to zero or close to zero). Accordingly, the control module 204 and/or the usage monitoring module 320 may measure the voltage across the resistor 508 when the relay 224 is open to determine usage information.

In other implementations, the control module 204 may implement other methods to determine whether hot water is needed. For example, a temperature sensor may be provided on an outside surface of the water heater 202 near an upper portion of the water heater 202, or mounted on a hot water line of the water heater 202. The control module 204 may determine that hot water is needed if a sensed temperature at the upper portion of the water heater or the hot water line decreases below a threshold, and close the relay 224 accordingly.

Referring now to FIG. 14, a water heater 600 may be initially installed without a control module as described in FIGS. 9-13, but may include an original manufacturer control module 602. Water (e.g., cold water) is supplied to the water heater 600 via a water supply line 604. Conversely, hot water is provided via a hot water line 606. Service wiring 608 provides AC power to the water heater 600.

For example, the water heater 600 may include a junction box including a junction box cover 610, mounted within the water heater 600. The junction box cover 610 may include first and second plates 612 and 614. The first plate 612 may provide connection for the wiring 608. The second plate 614 may be removable and provide access to wiring within the water heater 600. For example only, when installed the first plate 612 may include a perforated portion that is removed to form an opening 616 for connecting the wiring 608 within the water heater 600.

Referring now to FIG. 15, the control module 204 according to the present disclosure may be mounted to the water heater 600 at any time during or after installation. Specifically, the water heater 600 may be modified to accommodate connection to the control module 204. For example, the control module 204 may be mounted on the first plate 612. The service wiring 608 passes through the control module 204, and the service wiring 608 may be modified to connect to internal circuitry of the control module 204 as shown in FIGS. 10 and 11. Accordingly, a remaining portion of the service wiring 620 may remain connected to internal wiring of the water heater 600 through the second plate 614. In other words, the service wiring 608 external to the water heater 600 may be modified to interface with the control module 204 without disconnecting the wiring 620 from the internal wiring of the water heater 600. For example, an opening 622 may be formed in the second plate 614 to receive the wiring 620. Or, the wiring 620 may pass through the bottom of the control module 204 through the first plate 612. The originally provided first plate 612 and the second plate 614 may be modified to connect to the control module 204 and the wiring 620, and/or additional plates that are already configured to connect to the control module 204 may be provided with the control module 204.

In other implementations, the control module 204 may not connect to either of the plates 612 and 614. Instead, one or both of the plates 612 and 614 may be removed and the control module 204 can be connected directly to the water heater 600 (or, for example, via an optional adaptor). For example, the first plate 612 (i.e., a plate that receives the service wiring 608) may be removed. A bottom side of the control module 204 may be configured to cover the opening left by the removal of the first plate 612. For example only, a bottom footprint of the control module 204 may be configured to be the same size and shape as the first plate 612. Or, the control module 204 may include an integrated bottom plate that is sized to fit the opening. In other words, the integrated bottom plate may have a different footprint than the control module 204.

In other implementations, the control module 204 may be positioned in a location other than the top of the water heater 600. For example, the control module 204 may be mounted on a wall near or adjacent to the water heater 600. Accordingly, the control module 204 may interface with the service wiring 208 in a location other than at the junction box of the water heater 600. For example, the service wiring 208 may pass through or near the control module 204 mounted on the wall, and then into an opening of the first plate 612.

In any of the implementations described in FIG. 15, the control module interfaces with the service wiring 208 prior to the service wiring 208 entering the water heater 600. More specifically, the relay 224 is connected to interface with the service wiring 208 (e.g., is arranged in series with the service wiring 208) both external to the water heater 600 and either internal to or adjacent to the control module 204. Similarly, the current sensor 322 is arranged to communicate with the service wiring either internal to or adjacent to the control module 204.

Accordingly, the control module 204 can be arranged to selectively control current provided to the water heater 600, as well as monitor usage of the water heater 600, without modifying or accessing either internal circuitry of the water heater or the control module 602.

In some implementations, a balance valve 630 may be provided. The balance (i.e., mixing) valve 630 is connected between the water supply line 604 and the hot water line 606. The control module 204 may control the balance valve 630 to mix a selected amount of cold water from the water supply line 604 with the hot water line 606. For example, the balance valve 630 may be controlled to provide an amount of cold water to achieve the setpoint temperature. Conversely, an internal setpoint of the water heater 600 (e.g., corresponding to any internal thermostats of the water heater 600) may be set to a maximum setting (e.g., 160 degrees Fahrenheit). Accordingly, the temperature of the water supplied by the hot water line 606 is moderated by the balance valve 630.

In this manner, the water in the water heater 600 itself is maintained at the maximum temperature. With respect to hot water capacity, a water heater maintained at this maximum temperature is significantly larger than a water heater maintained at a lower temperature (e.g., 120 degrees Fahrenheit), increasing both capacity and efficiency. For example, the water heater 600 may be operated to heat the water to the maximum temperature during lowest pricing tier hours (e.g., between 10:00 pm and 10:00 am). Consequently, operation during higher pricing tier hours (e.g., between 10:00 am and 10:00 pm) can be reduced significantly.

In other implementations including the balance valve 630, a system described above in FIG. 10A may be controlled according to the usage information if the water heater 202 or energy information from the smart energy meter 208 via the communication module 206. For example, the microcontroller 304 may close the relay 224 to energize the upper heating element 220 and the lower heating element 222 during non-peak usage times of the power grid 210, high availability of renewable energy on the power grid 210, high usage times of the water heater 202, times associated with a low pricing tier, and any combination thereof to transfer energy usage from a less beneficial time to a more beneficial time. More specifically, it is typically beneficial to utilize renewable resources when they are available. If a certain time corresponds to a high availability of renewable energy on the power grid 210, the microcontroller 304 may close the relay 224 for as long as there is renewable energy available on the power grid 210 or until the maximum temperature is reached, whichever comes first. This allows energy used by the hot water heater to be transferred from non-renewable energy sources to renewable energy sources. Further, the microcontroller 304 may open the relay 224 only if there is sufficient hot water in the water heater 202 to satisfy anticipated demand during the upcoming low availability of renewable energy.

In addition, when the microcontroller 304 receives renewable energy information from the smart energy meter 208 via the communication module 206, the microcontroller 304 can estimate energy required to heat the water to the setpoint temperature by using temperature sensor 234, usage information of the water heater 202, or any combination thereof. The microcontroller 304 may then send this estimated energy to the smart energy network 212 via the communication module 206 and smart energy meter 208.

Referring now to FIG. 16, an example control module 700 may be mounted on a water heater 704. For example only, the water heater 704 may include an upper surface 708 and an electrical junction box 712 arranged adjacent to the upper surface 708. The upper surface 708 may include one or more plates 716 and 720, which may be removable. For example, the plate 716 may be removable to provide access to an interior of the electrical junction box 712 for inspection and/or service. The plate 720 may be integral to the water heater 704, or may be removable. The control module 700 may be mounted on the plate 720. Or, the plate 720 may be removed and a bottom surface of the control module 700 may replace the plate 720.

Service wiring 724 (e.g., wiring providing electrical power to the water heater 704 from a circuit breaker service panel or another suitable power source) may be inserted into the control module 700 through an opening 728 (e.g., a knock-out hole). Conversely, internal wiring 732 (e.g., internal hook-up wires configured to electrically communicate with the service wiring 724) of the water heater 704 may pass through an opening 736 in the plate 720 (and/or in the bottom surface of the control module 700) into the control module 700. For example only, the opening 736 may correspond to a knock-out hole in the plate 720 and/or a knock-out hole in the control module 700. For example only, the opening may include a threaded conduit 740 configured to interface with a threaded connection member 744 of the control module 700 for attachment of the control module 700 to the water heater 704.

The service wiring 724 may be connected to the internal wiring 732 within the control module 700. For example only, the control module 700 may include a control circuitry portion 748 and an electrical connection portion 752. The control circuitry portion 748 includes, for example, a current sensor 756 (shown, for example only, as an inductor), a relay 760, and other components as described in FIGS. 9-15.

The electrical connection portion 752 includes wire connection terminals 764-1, 764-2, 764-3, and 764-4, referred to collectively as wire connection terminals 764. For example, the wire connection terminals 764 include, but are not limited to, electrical lugs, twist-on wire connectors, and/or any other type of terminal for providing a connection interface between the service wiring 724 and the internal wiring 732. In this manner, the service wiring 724 may be disconnected from the internal wiring 732 (e.g., if the service wiring 724 is connected to the internal wiring 732 within the electrical junction box 712) and reconnected to the internal wiring 732 within the electrical connection portion 752 of the control module 700. Accordingly, no additional wiring needs to be provided to connect the service wiring 724 to the internal wiring 732, and no modifications (e.g., splicing or cutting) need to be made to the service wiring 724 or the internal wiring 732. Instead, the internal wiring 732 may be passed through the opening 736 into the electrical connection portion 752 and connected to the service wiring 724 within the control module 700.

For example only, the control module 700 may include a partition 768 that separates the electrical connection portion 752 from the control circuitry portion 748. The partition 768 may be electrically insulative to electrically isolate the control circuitry portion 748 from the service wiring 724 and the internal wiring 732.

Referring now to FIG. 17, the water heater 600 may include an externally mounted temperature sensor 780. The temperature sensor 780 is preferably mounted on a temperature and pressure (T&P) valve 784, but may be mounted on the hot water line 606 (e.g., as indicated by 780') or any other suitable location of the water heater 600. For example, the T&P valve 784 has characteristics of a thermal conductor to conduct heat from the hot water inside the water heater 600, which is in fluid communication with the T&P valve 784. Accordingly, the temperature of the T&P valve 784 varies with the temperature of the water inside the water heater 600. For example only, the temperature sensor 780 may include a thermocouple, a thermistor sensor, or any other suitable temperature sensor. The temperature sensor 780 senses a temperature of the valve 784 and provides the sensed temperature to the control module 204. The sensed temperature of the valve 784 closely corresponds to the temperature of the water in the water heater 600.

Referring now to FIG. 18, an exemplary relationship 800 between an actual water temperature 804 and a sensed temperature 808 provided by the temperature sensor 780 mounted on the T&P valve 784 is illustrated. As shown, the sensed temperature 808 closely corresponds to the actual water temperature 804. However, the sensed temperature 808 differs from the actual water temperature 804 by a temperature offset 812. Although the offset 812 may vary according to factors including, but not limited to, ambient temperature, draw events, and recovery periods (i.e., a period of reheating the water after a draw event), the offset 812 is relatively constant. Accordingly, the sensed temperature 808 is indicative of the actual water temperature 804.

The control module 204 monitors the sensed temperature 808 to determine the actual water temperature 804 and to control the water heater 600 accordingly (e.g., monitor and store usage history, open and close the switch 760, etc.). The control module 204 may first monitor the sensed temperature 808 to determine the actual water temperature 804. For example, the control module 204 may monitor the sensed temperature 808 to determine various setpoint temperatures, maximum temperatures, and/or trigger temperatures (e.g., temperatures that trigger recovery events) of the water heater 600.

For example only, the control module 204 may monitor the sensed temperature 808 for a predetermined period (e.g., 24 hours) to determine a maximum temperature of the sensed temperature 808 during the predetermined period. The maximum temperature of the sensed temperature 808 during predetermined period corresponds to a maximum temperature of the actual water temperature 804 during the same predetermined period. Typically, a maximum temperature of the actual water temperature 804 corresponds to a temperature setpoint. Accordingly, the control module 204 can determine that the maximum temperature of the sensed temperature 808 corresponds to the temperature setpoint of the water heater 600. Alternatively, the control module 204 may determine that a temperature peak of the sensed temperature 808 immediately following a recovery event corresponds to the temperature setpoint. For example, during a recovery event, heating elements of the water heater 600 may be energized until the actual water temperature 804 reaches the temperature setpoint.

The control module 204 estimates the offset 812 between the actual water temperature 804 and the sensed temperature 808 based on the maximum temperature of the sensed temperature 808. For example, if the temperature setpoint of the water heater 600 is known, then the control module 204 simply determines the offset 812 based on a difference between the maximum temperature of the sensed temperature 808 (e.g., an average difference, median difference, etc. over a predetermined period) and a known temperature setpoint associated with the water heater 600. For example only, a user may input or select a temperature setpoint using an interface of the control module 204.

Alternatively, if the temperature setpoint of the water heater 600 is not known, then the control module 204 may determine the offset 812 based on a difference between the maximum temperature of the sensed temperature 808 and an estimated temperature setpoint of the water heater 600. For example, the estimated temperature setpoint may be based on a typical and/or default maximum temperature setpoint (e.g., 130 degrees) associated with the water heater 600.

Further, it can be seen that the control module 204 may determine other temperatures of the actual water temperature 804 that trigger water heater events, such as recovery events. For example, as shown in FIG. 18, the sensed temperature 808 is also indicative of draw events and temperature drops that trigger recovery events.

The control module 204 may recalculate the offset 812 to compensate for any variations in the difference between the actual water temperature 804 and the sensed temperature 808. For example only, the control module 204 may recalculate the offset 812 periodically, after a reset event, in response to temperature changes (e.g., ambient temperature changes or changes in the sensed temperature 808) greater than or equal to a predetermined threshold, and/or in response to a user input.

In some implementations, the water heater 600 may have adjustable temperature setpoints and/or a plurality of predetermined temperature setpoints. For example, the predetermined temperature setpoints may include low (110° F.), medium (120° F.), and high (130° F.) temperature setpoints. Accordingly, the control module 204 may determine which of the predetermined temperature setpoints is selected and determine the sensed temperature 808 accordingly. For example, the control module 204 may determine the maximum sensed temperature over a predetermined period and determine whether the maximum sensed temperature varies as compared to previous predetermined periods.

For example only, the control module 204 may initially determine that the maximum sensed temperature corresponds to a default temperature setpoint (e.g., the medium temperature setpoint). Subsequently, if the maximum sensed temperature in a later predetermined period is greater than the initial maximum sensed temperature, the control module 204 may determine that the new maximum sensed temperature corresponds to a higher temperature setpoint (e.g., the high temperature setpoint). Conversely, if the maximum sensed temperature in a later predetermined period is less than the initial maximum sensed temperature, the control module 204 may determine that the new maximum sensed temperature corresponds to a lower temperature setpoint (e.g., the low temperature setpoint).

As described above, the control module 204 monitors the sensed temperature 808 and determines usage patterns of the water heater 600 and selectively opens and closes the relay 224 accordingly. For example, as described above with respect to FIGS. 9-16, an original manufacturer control module 602 maintains the actual water temperature 804 at the temperature setpoint (e.g., regardless of usage patterns/history). In other words, the control module 602 selectively energizes the heating elements of the water heater 600 to maintain the actual water temperature 804 as closely as possible to the temperature setpoint. For example only, the control module 602 may energize the heating elements until the actual water temperature 804 reaches the temperature setpoint and then de-energize the heating elements. Subsequently, the control module 602 may re-energize the heating elements when the actual water temperature 804 decreases below a threshold (e.g., an offset of several degrees less than the temperature setpoint).

Conversely, while the control module 602 operates to energize the heating elements regardless of usage patterns/history, the control module 204 selectively opens the relay 224 to interrupt energization of the heating elements by the control module 602 as described above with respect to FIGS. 9-17. Further, the control module 204 can accurately estimate the actual water temperature 804 using the sensed temperature 808 and control the relay 224 accordingly. For example, as described above, the control module 204 may open the relay 224 to prevent energization of the heating elements by the control module 602 if certain criteria are met (e.g., usage patterns/history indicate that hot water is not presently needed, to conserve energy, to delay energization until energy costs are more economical, etc.).

For example, the control module 204 may close the relay 224 to ensure that the actual water temperature 804 does not decrease below a predetermined minimum temperature. Or, the control module 204 may close the relay 224 a predetermined time before a predicted hot water draw. For example only, the predetermined time may be based on an estimate of how long it takes to increase the actual water temperature 804 from the predetermined minimum temperature to the temperature setpoint. Accordingly, if the control module 204 predicts a draw event at a time T (e.g., 6:00 AM or another time associated with household occupants waking up and using hot water), then the control module 204 may close the relay 224 at, for example only, a time Y (e.g., where Y=T−X and X corresponds to the length of time to heat the actual water temperature 804 to the temperature setpoint. Alternatively, the control module 204 may continuously calculate X based on a current actual water temperature 804. In other words, X may vary as the actual water temperature 804 decreases from the temperature setpoint to the predetermined minimum temperature.

Further, the control module 204 may adjust the predetermined minimum temperature and/or the predetermined time to close the relay 224 before an anticipated hot water draw according to previous observed results. For example, the control module 204 may monitor the actual water temperature 804 over time to determine whether the actual water temperature 804 typically reaches the setpoint temperature prior to the beginning of an anticipated hot water draw. If the control module 204 determines that the actual water temperature 804 does not reach the setpoint temperature in time for the hot water draw, the control module 204 may increase the predetermined minimum temperature and/or increase the predetermined time prior to the anticipated hot water draw to close the relay 224. For example only, the control module 204 may record a number of times over a predetermined period that the actual water temperature 804 does not reach the setpoint temperature prior to an anticipated hot water draw, and adjust the predetermined minimum temperature and/or the predetermined time prior to the anticipated hot water draw if the number of times exceeds a predetermined threshold.

In other words, as described above, although the control module 204 generally opens and closes the relay 224 based on criteria such as usage patterns/history, energy costs (e.g., in peak times vs. off-peak times), etc., the control module 204 also controls the relay 224 according to the predetermined minimum temperature. Accordingly, the predetermined minimum temperature may supersede other criteria. Further, the predetermined minimum temperature may vary as described above.

In some implementations, the control module 204 controls the relay 224 based on usage patterns/history, the predetermined minimum temperature, and load shedding information as shown below in Table 1. For example only, the control module 204 communicates with the power grid 210 (e.g., via the smart energy meter 208) to receive the load shedding information.

TABLE 1

| Usage | 1 | 2 | 3 | 4 |
|---|---|---|---|---|
| High | On | On | Off (110° min) | Off |
| Medium | On | Off (110° min) | Off (105° min) | Off |
| Low | Off (110° min) | Off (105° min) | Off (105° min) | Off |
| None | Off (110° min) | Off (105° min) | Off (105° min) | Off |

As shown in Table 1, the control module 204 (and/or the power grid 210, the smart energy meter 208, or another device) may store information indicative of a user's usage amount in a given period. The given period may correspond to one of a plurality of periods (e.g., six 4-hour periods) throughout a day. For example, the control module 204 may determine the usage amount based on the usage patterns/history. Further, the Table 1 may correspond to a plurality of water heaters in communication with the power grid 210.

The usage amount may include usage levels such as high, medium, low, and none (i.e., no usage during a given period). Each usage level corresponds to a different load shedding control for each load shedding category (1, 2, 3, or 4). For example, the load shedding categories correspond to a desired load shedding operation for water heaters associated power grid 210. Load shedding category 1 may correspond to a lowest level of load shedding while load shedding category 4 corresponds to a highest level of load shedding. For example only, if the power grid 210 is in (or, requests)

the load shedding category 1 (based on, for example, a low load time of day), water heaters associated with high or medium usage levels during that period are on. In other words, the associated control module 204 closes the relay 224. However, water heaters associated with low or no usage levels during that period are off, unless the actual water temperature 804 drops to a predetermined minimum temperature (e.g., 110° F.). In other words, the control module 204 opens the relay 224 until the actual water temperature 804 drops to the predetermined minimum temperature, and then closes the relay 224.

Similarly, if the power grid 210 is in the load shedding category 2, water heaters associated with a high usage level during that period are on. Water heaters associated with medium, low, or no usage levels during that period are off, unless the actual water temperature 804 drops to a predetermined minimum temperature. As shown in Table 1, the predetermined minimum temperatures may vary based on usage level. For example, the predetermined minimum temperature for water heaters associated with a medium usage level may be 110° F. while the predetermined minimum temperature for water heaters associated with low or no usage levels may be 105° F. In the load shedding category 3, water heaters associated with all usage levels during that period are off unless the actual water temperature 804 drops to a predetermined minimum temperature, which may vary by usage level.

The load shedding category 4 may correspond to a "critical" load shedding situation where load shedding has a maximum priority for the power grid 210. For example, the load shedding category 4 may correspond to a situation where load shedding must be performed to avoid power interruption (e.g., brownouts or other emergency operations). In the load shedding category 4, water heaters in all usage levels are off.

In some implementations, the control module 204 may control the relay 224 during recovery periods according to a duty cycle limit. For example, during a recovery period, the control module 204 may limit the amount of time that the relay 224 is closed in a given period (e.g., an hour). The amount of time may be predetermined, variable, and/or randomized. Further, the amount of time may be continuous within the given period, or separated (e.g., randomly) into different periods within the given period. For example only, a plurality of the control modules 204 associated with a plurality of respective water heaters may have different randomized times during the given period. In this manner, respective recovery periods may have a longer duration but reduce overall load.

Further, although the control module 204 is described in various implementations as including, for example, a communication module 206 for communication with the power grid 210 (e.g., via the smart energy meter 208), the control module 204 is configured to control the relay 224 as described above without communication with the power grid 210 and/or the smart energy meter 208. For example, the control module 204 may include a real time clock (not shown) to accurately determine a day, date, time of day, etc. The control module 204 may be programmed to include additional information including, but not limited to, peak and off peak timing information, grid load information, and/or other information related to cost and energy savings. Accordingly, the control module 204 controls the relay 224 as described above notwithstanding the ability to communicate with the power grid 210 and/or the smart energy meter 208.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for controlling a water heater that operates according to a voltage supply, the method comprising:
mounting a temperature sensor on at least one of a temperature and pressure (T&P) valve of the water heater and a hot water line of the water heater;
generating a temperature signal corresponding to a first temperature of the at least one of the T&P valve and the hot water line;
mounting a control module on the water heater, the control module including a switching module that receives the voltage supply and outputs the voltage supply to the water heater, wherein the voltage supply passes at least one of through and adjacent to the control module; and
using the control module,
determining, using the first temperature indicated by the temperature signal, a second temperature, wherein the second temperature is an actual temperature of water within the water heater, and wherein the first temperature and the second temperature are different, and
selectively actuating the switching module to turn on and turn off the voltage supply to the water heater based on the second temperature.

2. The method of claim 1 further comprising determining a relationship between the first temperature and the second temperature.

3. The method of claim 2 further comprising:
monitoring the first temperature for a predetermined period; and
determining the relationship based on changes in the first temperature during the predetermined period.

4. The method of claim 2 wherein the relationship includes an offset between the first temperature and the second temperature.

5. The method of claim 2 further comprising determining the relationship based on a maximum of the first temperature during a predetermined period.

6. The method of claim 5 wherein the maximum is related to a temperature setpoint of the water heater, and wherein when the first temperature is at the maximum, the second temperature is at the temperature setpoint.

7. The method of claim 6 further comprising determining the relationship based on a difference between the temperature setpoint and the maximum.

8. The method of claim 6 further comprising programming the control module with the temperature setpoint.

9. The method of claim 6 further comprising selecting the temperature setpoint from a plurality of possible temperature setpoints.

10. The method of claim 1 further comprising:
determining usage history of the water heater based on the voltage supply; and
selectively actuating the switching module further based on the usage history.

11. The method of claim 10 further comprising selectively actuating the switching module further based on at least one of peak usage information, load shedding information, and tiered pricing information.

12. The method of claim 10 further comprising selectively actuating the switching module further based on a predetermined minimum temperature.

13. The method of claim 12 wherein the predetermined minimum temperature is a predetermined amount less than a temperature setpoint of the water heater.

* * * * *